(12) United States Patent
Takeno et al.

(10) Patent No.: US 10,604,673 B2
(45) Date of Patent: Mar. 31, 2020

(54) BLOCKED POLYISOCYANATE COMPOSITION, ONE-COMPONENT COATING COMPOSITION, COATING FILM, AND COATED ARTICLE

(71) Applicant: ASAHI KASEI KABUSHIKI KAISHA, Tokyo (JP)

(72) Inventors: Satoshi Takeno, Tokyo (JP); Takashi Fukuchi, Tokyo (JP); Masakazu Yamauchi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 22 days.

(21) Appl. No.: 15/756,377

(22) PCT Filed: Sep. 9, 2016

(86) PCT No.: PCT/JP2016/076668
§ 371 (c)(1),
(2) Date: Feb. 28, 2018

(87) PCT Pub. No.: WO2017/043646
PCT Pub. Date: Mar. 16, 2017

(65) Prior Publication Data
US 2018/0282574 A1 Oct. 4, 2018

(30) Foreign Application Priority Data

Sep. 11, 2015 (JP) ................. 2015-180016
Sep. 11, 2015 (JP) ................. 2015-180021
Oct. 22, 2015 (JP) ................. 2015-207937
Nov. 18, 2015 (JP) ................. 2015-225990

(51) Int. Cl.
| | | |
|---|---|---|
| *C08G 18/10* | (2006.01) | |
| *C08G 18/28* | (2006.01) | |
| *C08G 18/32* | (2006.01) | |
| *C08G 18/73* | (2006.01) | |
| *C08G 18/79* | (2006.01) | |
| *C08G 18/80* | (2006.01) | |
| *C08K 5/10* | (2006.01) | |
| *C09D 7/40* | (2018.01) | |
| *C09D 7/63* | (2018.01) | |
| *C09D 175/04* | (2006.01) | |

(52) U.S. Cl.
CPC .......... *C09D 175/04* (2013.01); *C08G 18/10* (2013.01); *C08G 18/282* (2013.01); *C08G 18/3206* (2013.01); *C08G 18/73* (2013.01); *C08G 18/792* (2013.01); *C08G 18/80* (2013.01); *C08G 18/8093* (2013.01); *C08K 5/10* (2013.01); *C09D 7/40* (2018.01); *C09D 7/63* (2018.01)

(58) Field of Classification Search
CPC .. C08G 18/8093; C08G 18/73; C08G 18/792; C08G 18/10; C08G 18/282; C08G 18/3206; C08G 18/80; C08K 5/10; C09D 175/04; C09D 7/40; C09D 7/63

See application file for complete search history.

(56) References Cited

U.S. PATENT DOCUMENTS

| | | | |
|---|---|---|---|
| 4,098,933 A | 7/1978 | Burkhardt et al. | |
| 4,373,081 A | 2/1983 | Nachtkamp et al. | |
| 4,426,510 A * | 1/1984 | DelDonno ........... | C08G 18/089 521/113 |
| 5,705,593 A | 1/1998 | Schmalstieg et al. | |
| 6,274,693 B1 * | 8/2001 | Poth .................. | C08G 18/6254 427/385.5 |
| 2002/0165335 A1 | 11/2002 | Masami et al. | |
| 2006/0089481 A1 | 4/2006 | Roesler et al. | |
| 2006/0276611 A1 | 12/2006 | Katamura et al. | |
| 2012/0316291 A1 | 12/2012 | Yamauchi et al. | |

FOREIGN PATENT DOCUMENTS

| | | |
|---|---|---|
| CA | 1 187 083 A | 5/1985 |
| CN | 1762988 | 4/2006 |
| EP | 159117 A1 | 10/1985 |
| JP | S51-077695 A | 7/1976 |
| JP | S57-121065 A | 7/1982 |
| JP | S59-004658 A | 1/1984 |

(Continued)

OTHER PUBLICATIONS

Wang, Y., "Electron Transfer and Coordination Reactions Between MnIII,IVO2(BIRNESSITE), MnIIIOOH(MANGANITE), and Oxygen-Donor Aliphatic Compounds", from website: https://jscholarship.library.jhu.edu/bitstream/handle/1774.2/858/Chapter%204%5b1%5d.%20Malonate.pdf?sequence=6&isAllowed=y, Aug. 2006, pp. 128-159.*

Mehta, "Chemistry of Enolates and Enols-Acidity of Alpha-Hydrogens", from https://pharmaxchange.info/2011/02/chemistry-of-enolates-and-enols-acidity-of-alpha-hydrogens/, Feb. 2011.*

Douglas A. Wicks and Zeno W. Wicks, Jr., "Blocked Isocyanates III: Part A. Mechanisms and Chemistry", Progress in Organic Coatings, vol. 36, pp. 148-172, (Jan. 1, 1999) XP001065209.

European Search Report issued with respect to Application No. 16844507.0, dated Jan. 15, 2019.

(Continued)

*Primary Examiner* — Patrick D Niland
(74) *Attorney, Agent, or Firm* — Greenblum & Bernstein, P.L.C.

(57) ABSTRACT

The present invention provides a blocked polyisocyanate composition comprising a blocked polyisocyanate obtained from a blocking agent and a polyisocyanate derived from at least one diisocyanate selected from the group consisting of an aliphatic diisocyanate and an alicyclic diisocyanate, wherein the blocking agent comprises at least one selected from the group consisting of a malonic acid diester compound having a specific structure and a β-ketoester compound having a specific structure, and a molar ratio of a total of a specific keto form structure and a specific keto form structure to a total of a specific enol form structure and a specific enol form structure is 75/25 or more and 97/3 or less.

13 Claims, No Drawings

(56) References Cited

FOREIGN PATENT DOCUMENTS

| | | |
|---|---|---|
| JP | S60-149572 A | 8/1985 |
| JP | H08-225630 A | 3/1996 |
| JP | H09-125001 A | 5/1997 |
| JP | H09-255915 A | 9/1997 |
| JP | 2001-521956 A | 11/2001 |
| JP | 2002-322238 A | 11/2002 |
| JP | 2006-335954 A | 12/2006 |
| JP | 2011-157439 A | 8/2011 |
| JP | 2011-231306 A | 11/2011 |
| WO | 1999/023133 A1 | 5/1999 |

OTHER PUBLICATIONS

International Search Report from Patent Application No. PCT/JP2016/076668, dated Dec. 6, 2016.
International Preliminary Report on Patentability from Patent Application No. PCT/JP2016/076668, dated Mar. 13, 2018.
Polymer Preprints, Oligomers of H12-MDI and Diethyl Malonate as Precursors for Low Temperature Powder Coatings Crosslinkers, 2004, 45(2), p. 183-184.

* cited by examiner

BLOCKED POLYISOCYANATE COMPOSITION, ONE-COMPONENT COATING COMPOSITION, COATING FILM, AND COATED ARTICLE

TECHNICAL FIELD

The present invention relates to a blocked polyisocyanate composition, a one-component coating composition, a coating film, and a coated article.

BACKGROUND ART

Polyisocyanate compositions as with melamine-based curing agents are widely used as thermally crosslinkable curing agents for baking finishes. In recent years, it is pointed out that formalin is produced when a melamine-based curing agent is used, and polyisocyanates that are blocked with a blocking agent (blocked polyisocyanates) attract attention from the viewpoint of global environment, safety, health, and the like.

To date, oximes, phenols, alcohols, and lactams are known as blocking agents of blocked polyisocyanates.

A pyrazole-based blocked polyisocyanate composition (see, for example, Patent Literature 1) and an aliphatic secondary amine-based blocked polyisocyanate composition (see, for example, Patent Literature 2) are disclosed as blocked polyisocyanates capable of forming crosslinked coating films at relatively low temperatures.

A blocked polyisocyanate composition having a malonic acid diester as a blocking agent (see, for example, Patent Literature 3), blocked polyisocyanate compositions having diethyl malonate and ethyl acetoacetate as blocking agents (see, for example, Patent Literatures 4 and 5), and the like are proposed as blocked polyisocyanate compositions enabling the baking temperature to be further lowered.

CITATION LIST

Patent Literature

Patent Literature 1: European Patent Application Publication No. 159117
Patent Literature 2: Japanese Patent Laid-Open No. 59-4658
Patent Literature 3: Japanese Patent Laid-Open No. 57-121065
Patent Literature 4: Japanese Patent Laid-Open No. 8-225630
Patent Literature 5: Japanese Patent Laid-Open No. 9-255915

SUMMARY OF INVENTION

Technical Problem

However, blocked polyisocyanate compositions formed with conventional blocking agents generally require a high baking temperature of 140° C. or higher, thus resulting in extremely high energy costs. For processing on plastics having poor heat resistance, there is a restriction that blocked polyisocyanate compositions requiring high-temperature backing cannot be used.

Blocked polyisocyanate compositions as described in Patent Literatures 1 and 2 require a baking temperature of about 120° C., and an even lower baking temperature is desired.

In applications such as coating brand-new automobiles, a coating film such as a clear layer may be further layered on top of a coating film layer in which a conventional blocked polyisocyanate composition is used. As a blocked polyisocyanate composition for use in such a case, a blocked polyisocyanate composition is desired that is capable of forming a crosslinked coating film at a temperature of 100° C. or lower and that has good adhesion when layered.

On the other hand, blocked polyisocyanate compositions as described in Patent Literatures 3, 4, and 5 are capable of forming crosslinked coating films at a temperature of 100° C. or lower, but still have a problem with respect to adhesion when a coating film is further layered on top of coating film layers in which these blocked polyisocyanate compositions are used. A coating film such as a clear layer may be further layered on top of coating film layers in which these blocked polyisocyanate compositions are used, and thus a blocked polyisocyanate composition having good adhesion when layered as well as a one-component coating composition containing such a composition are desired. Meanwhile, in some cases where these blocked polyisocyanate compositions are used, compatibility with some polyols may be insufficient.

Accordingly, an object of the present invention is to provide a blocked polyisocyanate composition having excellent adhesion to an upper-layer coating film when coating films are layered and having excellent compatibility with polyols while retaining low-temperature curability.

Solution to Problem

As a result of having conducted diligent research, the inventors surprisingly found that a blocked polyisocyanate composition containing in a specific proportion a compound having a specific structure has excellent adhesion to an upper-layer coating film when coating films are layered and has excellent compatibility with polyols while retaining low-temperature curability, and thus accomplished the present invention.

That is to say, the present invention has the following configurations.

[1]

A blocked polyisocyanate composition comprising a blocked polyisocyanate obtained from a blocking agent and a polyisocyanate derived from at least one diisocyanate selected from the group consisting of an aliphatic diisocyanate and an alicyclic diisocyanate, wherein the blocking agent comprises at least one selected from the group consisting of a malonic acid diester compound represented by formula (I) below and a β-ketoester compound represented by formula (II) below, and a molar ratio of a total of a keto form structure represented by formula (III) below and a keto form structure represented by formula (IV) below to a total of an enol form structure represented by formula (V) below and an enol form structure represented by formula (VI) below is 75/25 or more and 97/3 or less:

(I)

-continued

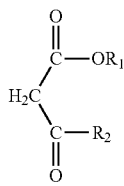
(II)

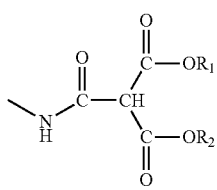
(III)

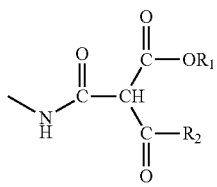
(IV)

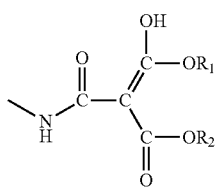
(V)

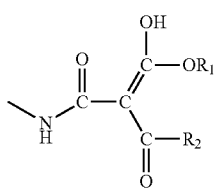
(VI)

wherein $R_1$ and $R_2$ each independently represent an alkyl group having 1 to 8 carbon atoms, a cycloalkyl group, a phenyl group, or a benzyl group; and a plurality of $R_1$ or $R_2$ are independent from each other.

[2]

The blocked polyisocyanate composition according to [1], wherein the molar ratio of the total of the keto form structures to the total of the enol form structures is 75/25 or more and 96/4 or less.

[3]

The blocked polyisocyanate composition according to [1] or [2], wherein the blocking agent comprises the malonic acid diester compound, and a proportion of a methanetetracarbonyl structure represented by formula (VII) below to a total amount of an isocyanate-malonic acid diester bonded structure is 0.5 mol % or more and 10 mol % or less:

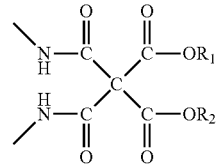
(VII)

wherein $R_1$ and $R_2$ each independently represent an alkyl group having 1 to 8 carbon atoms, a cycloalkyl group, a phenyl group, or a benzyl group.

[4]

The blocked polyisocyanate composition according to any of [1] to [3], further comprising a monoalcohol compound, wherein when numbers of moles of following 3 bonds contained in the blocked polyisocyanate are referred to as (a) to (c), respectively, (a)/((a)+(b)+(c))=0.0020 or more and less than 0.50:

(a) a urethane bond between an isocyanate group and the monoalcohol compound (b) a bond between the isocyanate group and the malonic acid diester compound (c) a bond between the isocyanate group and the β-ketoester compound.

[5]

The blocked polyisocyanate composition according to any of [1] to [4], further comprising a monoalcohol compound, wherein the blocked polyisocyanate composition comprises at least a blocked isocyanate structure in which an isocyanate group is blocked with enol form of the malonic acid diester compound and which is represented by formula (V), and in the blocked polyisocyanate composition, a molar ratio of the blocked isocyanate structure in which at least one of $R_1$ and $R_2$ in formula (V) represents an alkyl group having 4 or more and 8 or fewer carbon atoms to a total amount of the blocked isocyanate structure is 0.50 or more and less than 0.95.

[6]

The blocked polyisocyanate composition according to any of [1] to [5], wherein the blocking agent comprises the malonic acid diester compound and the β-ketoester compound.

[7]

The blocked polyisocyanate composition according to [6], wherein a molar ratio of the malonic acid diester compound to the β-ketoester compound exceeds 1.0.

[8]

The blocked polyisocyanate composition according to any of [1] to [7], wherein the malonic acid diester compound is diethyl malonate, and the β-keto ester compound is ethyl acetoacetate.

[9]

A one-component coating composition comprising the blocked polyisocyanate composition according to any of [1] to [8] and a polyol.

[10]

A coating film formed of the one-component coating composition according to [9].

[11]

A coated article coated with the one-component coating composition according to [9].

Advantageous Effects of Invention

The blocked polyisocyanate composition according to the present invention has excellent adhesion to an upper-layer coating film when coating films are layered and has excellent compatibility with polyols while retaining low-temperature curability.

DESCRIPTION OF EMBODIMENT

Below, an embodiment for carrying out the present invention (hereinafter simply referred to as "the present embodiment") will now be described in detail. The present invention is not limited to the following embodiment, and various modifications can be made within the scope of the invention.

[Blocked Polyisocyanate Composition]

The blocked polyisocyanate composition of the present embodiment contains a blocked polyisocyanate obtained from a blocking agent and a polyisocyanate derived from at least one diisocyanate selected from the group consisting of an aliphatic diisocyanate and an alicyclic diisocyanate. The blocking agent contains at least one selected from the group consisting of a malonic acid diester compound represented by formula (I) below and a β-ketoester compound represented by formula (II) below. Moreover, in the blocked polyisocyanate composition, the molar ratio of the total of a keto form structure represented by formula (III) below and a keto form structure represented by formula (IV) below to the total of an enol form structure represented by formula (V) below and an enol form structure represented by formula (VI) below is 75/25 or more and 97/3 or less:

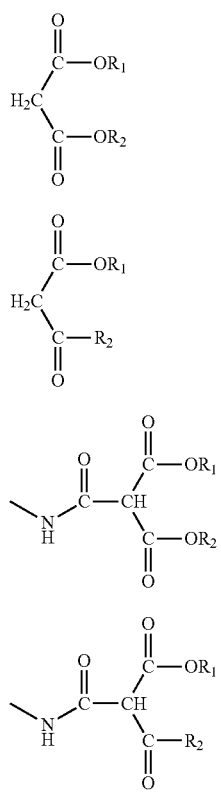

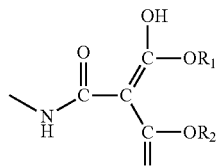

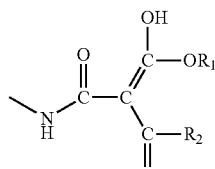

wherein $R_1$ and $R_2$ each independently represent an alkyl group having 1 to 8 carbon atoms, a cycloalkyl group, a phenyl group, or a benzyl group; and a plurality of $R_1$ or $R_2$ are independent from each other.

The blocked polyisocyanate composition of the present embodiment contains at least one of the keto form structure represented by formula (III) and the keto form structure represented by formula (IV) as well as at least one of the enol form structure represented by formula (V) and the enol structure represented by formula (VI) as essential components. In formulae (III) to (VI), $R_1$ and $R_2$ each independently represent an alkyl group having 1 to 8 carbon atoms, a cycloalkyl group, a phenyl group, or a benzyl group. $R_1$ and $R_2$ may be the same or different. An alkyl group having 8 or fewer carbon atoms or a cycloalkyl group is preferable because a decrease of the effective NCO content may be suppressed and, also, a decrease of compatibility with the main agent and the like when a coating material is formed may be suppressed. Among these, $R_1$ and $R_2$ each independently preferably represent an alkyl group having 1 to 8 carbon atoms, more preferably represent an alkyl group having 1 to 4 carbon atoms, even more preferably represent a methyl group, an ethyl group, a n-propyl group, an isopropyl group, or a n-butyl group, yet more preferably represent a methyl group or an ethyl group, and far more preferably represent an ethyl group.

The molar ratio of the keto form structure represented by formula (III) and the keto form structure represented by formula (IV) to the total of the enol form structure represented by formula (V) and the enol form structure represented by formula (VI) is 75/25 or more and 97/3 or less. Preferably the molar ratio is 75/25 or more and 96/4 or less, more preferably the molar ratio is 80/20 or more and 95/5 or less, even more preferably the molar ratio is 85/15 or more and 94/6 or less, and yet more preferably the molar ratio is 87/13 or more and 93/7 or less. When the molar ratio is 75/25 or more, good compatibility with polyols can be obtained. When the molar ratio is 97/3 or less, a coating film layer in which the blocked polyisocyanate composition of the present embodiment is used can exhibit adhesion to an upper-layer coating film further coated thereon. The molar ratio can be measured by the method described in the Examples below.

Preferably, in the blocked polyisocyanate composition of the present embodiment, the blocking agent contains a malonic acid diester compound, and in the blocked polyisocyanate composition, the proportion of a methanetetracarbonyl structure represented by formula (VII) below to the total amount (100 mol %) of an isocyanate-malonic acid diester bonded structure is 0.5 mol % or more and 10 mol % or less.

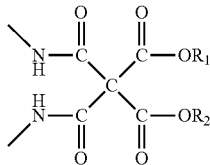

(VII)

The blocked polyisocyanate composition of the present embodiment preferably has a methanetetracarbonyl structure represented by formula (VII). $R_1$ and $R_2$ in formula (VII) each independently represent an alkyl group having 1 to 8 carbon atoms, a phenyl group, or a benzyl group. $R_1$ and $R_2$ may be the same or may be different. With a methanetetracarbonyl structure wherein $R_1$ and $R_2$ each independently represent an alkyl group having 8 or fewer carbon atoms, a phenyl group, or a benzyl group, there is a tendency that a decrease of the effective NCO content is suppressed, and compatibility with the main agent and the like when a coating material is formed can be improved, which is more preferable. A methanetetracarbonyl structure is preferable wherein $R_1$ and $R_2$ each independently represent, among these, an alkyl group having 1 to 8 carbon atoms, a methanetetracarbonyl structure is more preferable wherein $R_1$ and $R_2$ each independently represent an alkyl group having 1 to 4 carbon atoms, and a methanetetracarbonyl structure is even more preferable wherein $R_1$ and $R_2$ each independently represent an ethyl group, a n-propyl group, an isopropyl group, a n-butyl group, or an isobutyl group.

In the blocked polyisocyanate composition, the proportion of the methanetetracarbonyl structure represented by formula (VII) to the total amount (100 mol %) of the isocyanate-malonic acid diester bonded structure is preferably 0.5 mol % or more and 10 mol % or less. The lower limit of the proportion is more preferably 0.7 mol %, even more preferably 1.0 mol %, yet more preferably 1.5 mol %, and far more preferably 2.0 mol %. The upper limit of the proportion is more preferably 8.0 mol %, even more preferably 6.0 mol %, yet more preferably 5.0 mol %, and far more preferably 4.0 mol %. When the proportion is 0.5 mol % or more, there is a tendency that a coating film layer in which the blocked polyisocyanate composition of the present embodiment is used can exhibit adhesion to an upper-layer coating film further coated thereon and, also, when the proportion is 10 mol % or less, there is a tendency that compatibility with polyols can be maintained. The proportion can be measured by the method described in the Examples below.

The isocyanate-malonic acid diester bonded structure refers to a structure in which an isocyanate group and a malonic acid diester are chemically bonded, and examples include a methanetricarbonyl structure (a keto form, an enol form) and a methanetetracarbonyl structure.

It was surprising that in the present embodiment, when the methanetetracarbonyl structure represented by formula (VII) is contained in an amount within a specific range, a blocked polyisocyanate composition is obtained that exhibits not only low-temperature curability but also adhesion to an upper-layer coating film and that has excellent compatibility with polyols.

Preferably, the blocked polyisocyanate composition of the present embodiment further contains a monoalcohol compound that will be described below. More preferably, in the blocked polyisocyanate composition, the molar ratio of the monoalcohol compound to the blocked polyisocyanate group of the blocked polyisocyanate composition is 0.2 or more and 10 or less.

Examples of the monoalcohol compound include, but are not particularly limited to, aliphatic, alicyclic, aromatic, and such monoalcohol compounds, and, in particular, aliphatic monoalcohol compounds are preferable. The aliphatic monoalcohol compound is more preferably, but is not particularly limited to, a monoalcohol compound having 1 to 20 carbon atoms. Examples of the monoalcohol compound having 1 to 20 carbon atoms include, but are not particularly limited to, saturated alcohols such as methanol, ethanol, n-propanol, isopropanol, n-butanol, 2-butanol, t-butanol, 2-ethyl-1-propanol, n-amyl alcohol, 2-pentanol, 3-pentanol, 2-methyl-1-butanol, 3-methyl-1-butanol, 2-methyl-2-butanol, 3-methyl-2-butanol, and 2,2-dimethyl-1-propanol; and ether alcohols such as 2-methoxyethanol, 2-ethoxyethanol, 2-butoxyethanol, and 3,6-dioxa-1-heptanol.

The molar ratio of the monoalcohol compound to the blocked polyisocyanate group contained in the blocked polyisocyanate composition is more preferably 0.2 or more and 10 or less. The lower limit of the molar ratio is even more preferably 0.4, yet more preferably 0.7, and far more preferably 1.0. The upper limit of the molar ratio is even more preferably 7.0, yet more preferably 5.0, and far more preferably 3.0. When the molar ratio is 0.2 or more, there is a tendency that storage stability when a one-component coating composition is formed can be ensured, and when the molar ratio is 10 or less, there is a tendency that a decrease of the effective NCO content can be suppressed.

The effective isocyanate group content (hereinafter, the effective NCO group content) of the blocked polyisocyanate refers to the content of potentially existing isocyanate groups based on the total mass of the blocked polyisocyanate.

The effective NCO content (hereinafter referred to as the "effective NCO group content") of the blocked polyisocyanate composition is not particularly limited, and is preferably 3.0 mass % or more and 22 mass % or less, more preferably 5.0 mass % or more and 20 mass % or less, even more preferably 8.0 mass % or more and 20 mass % or less, yet more preferably 8.0 mass % or more and 18 mass % or less, and far more preferably 10 mass % or more and 15 mass % or less based on the total amount (100 mass %) of solids. When the effective NCO group content is 3.0 mass % or more and 22 mass % or less based on the total amount (100 mass %) of solids, there is a tendency that low-temperature stability and storage stability are simultaneously achieved. When the effective NCO content is 8.0 mass % or more based on the total amount (100 mass %) of solids, there is a tendency that a good post-baking crosslink density can be maintained, and when the effective NCO content is 20 mass % or less, there is a tendency that the smoothness of a baked coated film is ensured. For example, in order to obtain a blocked polyisocyanate composition having an effective NCO content of 8.0 mass % or more and 20 mass % or less based on the total amount (100 mass %) of solids, a polyisocyanate having an NCO content of, for example, 15 mass % or more and 25 mass % or less may be used as a starting material. The effective NCO content can be measured by the method described in the Examples below.

The effective NCO group content can also be determined from the amount and the NCO group content of the polyisocyanate charged and the amount of the blocking agent charged.

The solids concentration of the blocked polyisocyanate composition is not particularly limited, and is preferably 40 mass % or more and 80 mass % or less, and more preferably 50 mass % or more and 70 mass % or less. When the solids concentration is 40 mass % or more, there is a tendency that the amount of components volatilized during baking can be reduced, and when the solids concentration is 80 mass % or less, there is a tendency that workability when formulating the blocked polyisocyanate composition can be improved. In order to obtain a polyisocyanate having a solids concentration of 40 mass % or more and 80 mass % or less, a solvent may be added before or after synthesizing the blocked polyisocyanate composition so as to attain such a solids concentration. The solids concentration can be measured by the method described in the Examples below.

More preferably, the blocked polyisocyanate composition in the present embodiment further contains a monoalcohol compound, and (a)/((a)+(b)+(c)) is 0.0020 or more and less than 0.50 where the numbers of moles of (a) a urethane bond between the isocyanate group and the monoalcohol compound, (b) a bond between the isocyanate group and the malonic acid diester compound, and (c) a bond between the isocyanate group and the β-ketoester compound contained in the blocked polyisocyanate are referred to as (a) to (c), respectively.

When the blocked polyisocyanate composition of the present embodiment has the above configuration, there is a tendency that a blocked polyisocyanate composition can be provided that simultaneously achieves higher compatibility with the main agent and low-temperature storage stability.

More preferably, the blocked polyisocyanate composition of the present embodiment further contains a monoalcohol compound, the blocked polyisocyanate composition contains at least a blocked isocyanate structure in which the isocyanate group is blocked with the enol form of the malonic acid diester compound and which is represented by formula (V), and in the blocked polyisocyanate composition, the molar ratio of the blocked isocyanate structure in which at least one of $R_1$ and $R_2$ in formula (V) represents an alkyl group having 4 or more and 8 or fewer carbon atoms to the total amount of the blocked isocyanate structure is 0.50 or more and less than 0.95:

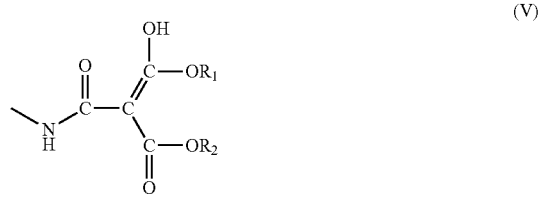

(V)

wherein $R_1$ and $R_2$ each independently represent an alkyl group having 1 to 8 carbon atoms.

Having the above configuration, the blocked polyisocyanate composition of the present embodiment tends to have better low-temperature curability, compatibility, and storage stability.

More preferably, the blocked polyisocyanate composition of the present embodiment contains at least a blocked isocyanate structure in which the isocyanate group contained in a polyisocyanate that will be described below is blocked with the enol form of the malonic acid diester and which is represented by formula (V). In order to obtain a blocked polyisocyanate composition containing such a blocked isocyanate structure, for example, a polyisocyanate that will be described below may be blocked with a malonic acid diester and then, further, reacted with a monoalcohol compound. In such a blocked polyisocyanate, the isocyanate group of the polyisocyanate is partially blocked with a blocking agent containing the malonic acid diester. That is to say, the blocked isocyanate structure may contain a structure remaining blocked with the malonic acid diester that will be described below and a structure reacted with the monoalcohol compound.

Moreover, it is preferable from the viewpoint of low-temperature curability that the blocked polyisocyanate composition contains a blocked isocyanate structure in which at least one of $R_1$ and $R_2$ in formula (V) represents an ethyl group. In order to obtain a blocked polyisocyanate composition containing a blocked isocyanate structure in which at least one of $R_1$ and $R_2$ in formula (V) represents an ethyl group, for example, diethyl malonate may be used as the malonic acid diester that will be described below.

In the blocked polyisocyanate composition, the molar ratio of the blocked isocyanate structure in which at least one of $R_1$ and $R_2$ in formula (V) represents an alkyl group having 4 or more and 8 or fewer carbon atoms to the total amount of the blocked isocyanate structure is preferably 0.50 or more and less than 0.95, more preferably 0.60 or more and 0.93 or less, even more preferably 0.65 or more and 0.91 or less, and yet more preferably 0.70 or more and 0.90 or less. When the molar ratio is within such a range, curability and compatibility tend to be improved. The molar ratio can be measured by the method described in the Examples below.

<Polyisocyanate>

The polyisocyanate of the present embodiment is derived from at least one diisocyanate selected from the group consisting of an aliphatic diisocyanate and an alicyclic diisocyanate.

The polyisocyanate of the present embodiment is obtained from one or two or more diisocyanates selected from the group consisting of aliphatic diisocyanates and alicyclic diisocyanates and is a multimer composed of a dimer or a higher-order oligomer of such a diisocyanate.

The "aliphatic diisocyanate" in the present embodiment refers to a compound having two isocyanate groups and a chain aliphatic hydrocarbon and not having an aromatic hydrocarbon within the molecule. The "aliphatic diisocyanate" in the present embodiment also refers to a compound having a chain aliphatic hydrocarbon and not having an aromatic hydrocarbon within the molecule when the isocyanate groups are excluded.

The aliphatic diisocyanate is not particularly limited, and is preferably an aliphatic diisocyanate having 4.0 or more and 30 or fewer carbon atoms, and examples include tetramethylene diisocyanate, pentamethylene diisocyanate, hexamethylene diisocyanate (hereinafter abbreviated as "HDI"), butane diisocyanate, pentane diisocyanate, trimethylhexamethylene diisocyanate, 2,2,4-trimethyl-1,6-diisocyanatohexane, and lysine diisocyanate. It is more preferable to use such an aliphatic diisocyanate because the resulting polyisocyanate has low viscosity. In particular, HDI is more preferable in terms of industrial availability. The aliphatic diisocyanates may be used singly, or may be used as a combination of two or more.

In the present embodiment, the "alicyclic diisocyanate" refers to a compound having two isocyanate groups and a non-aromatic cycloaliphatic hydrocarbon within the molecule. In the present embodiment, the "alicyclic diisocyanate" also refers to a compound having a non-aromatic cycloaliphatic hydrocarbon within the molecule.

The alicyclic diisocyanate is not particularly limited, and is preferably an alicyclic diisocyanate having 8.0 or more and 30 or fewer carbon atoms, and examples include isophorone diisocyanate (hereinafter abbreviated as "IPDI"), 1,3-bis(isocyanatomethyl)-cyclohexane, 4,4'-dicyclohexylmethane diisocyanate, norbornene diisocyanate, hydrogenated xylylene diisocyanate, hydrogenated diphenylmethane diisocyanate, and 1,4-cyclohexane diisocyanate. In particular, IPDI is more preferable in terms of weather resistance and industrial availability. The alicyclic diisocyanates may be used singly, or may be used as a combination of two or more.

Among the above aliphatic and alicyclic diisocyanates, HDI, isophorone diisocyanate, hydrogenated xylylene diisocyanate, and hydrogenated diphenylmethane diisocyanate are preferable in terms of industrially availability, and HDI is more preferable. When HDI is used, a coating film obtained from the polyisocyanate composition tends to have better weather resistance and flexibility.

The aliphatic and alicyclic diisocyanates may be used singly, and can be used as a combination of two or more.

Examples of the polyisocyanates derived from the above-described diisocyanates include, but are not particularly limited to, oligomers such as dimers to icosamers of diisocyanates produced by forming a biuret bond, a urea bond, an isocyanurate bond, a uretdione bond, a urethane bond, an allophanate bond, an oxadiazinetrione bond, or the like on the aliphatic diisocyanates and/or the alicyclic diisocyanates. A polyisocyanate having a biuret bond is obtained by, for example, reacting a so-called biuretizing agent such as water, t-butanol, or urea with a diisocyanate such that the molar ratio of the biuretizing agent to the isocyanate groups of the diisocyanate is about 1/2 to about 1/100, followed by purification to remove an unreacted diisocyanate. A polyisocyanate having an isocyanurate bond is obtained by, for example, performing a cyclotrimerization reaction with a catalyst or the like and terminating the reaction when the conversion rate is about 5 to about 80 mass %, followed by purification to remove an unreacted diisocyanate. At this time, a mono- to hexahydric alcohol compound such as 1,3-butanediol or trimethylolpropane can be used in combination.

In general, the catalyst when producing the polyisocyanate having an isocyanurate bond is preferably a basic catalyst. Examples of such catalysts include (1) hydroxides of, and salts of organic weak acids such as acetic acid and capric acid of, tetraalkylammoniums such as tetramethylammonium, tetraethylammonium, tetrabutylammonium, and trimethylbenzylammonium, (2) hydroxides of, and salts of organic weak acids such as acetic acid and capric acid of, hydroxyalkylammoniums such as trimethylhydroxypropylammonium, trimethylhydroxyethylammonium, triethylhydroxypropylammonium, and triethylhydroxyethylammonium, (3) alkylmetal salts of tin, zinc, lead, and the like with alkylcarboxylic acids, (4) metal alcoholates of sodium, potassium, and the like, (5) aminosilyl group-containing compounds such as hexamethyldisilazane, (6) Mannich bases, (7) tertiary amines and epoxy compounds used in combination, and (8) phosphorus-based compounds such as tributylphosphine. Two or more of these may be used in combination.

When there is a possibility that the catalyst adversely affects the coating material or coating film properties, it is preferable to neutralize the catalyst with an acidic compound or the like. Examples of the acidic compound in this case include, but are not particularly limited to, inorganic acids such as hydrochloric acid, phosphorous acid, and phosphoric acid; sulfonic acids or derivatives thereof such as methanesulfonic acid, p-toluenesulfonic acid, a p-toluenesulfonic acid methyl ester, and a p-toluenesulfonic acid ethyl ester; ethyl phosphate, diethyl phosphate, isopropyl phosphate, diisopropyl phosphate, butyl phosphate, dibutyl phosphate, 2-ethylhexyl phosphate, di(2-ethylhexyl) phosphate, isodecyl phosphate, diisodecyl phosphate, oleyl acid phosphate, tetracosyl acid phosphate, ethylglycol acid phosphate, butyl pyrophosphate, and butyl phosphite. Two or more of these may be used in combination.

The polyisocyanate having a urethane bond is obtained by, for example, reacting a di- to hexahydric alcohol compound such as trimethylolpropane with a diisocyanate such that the molar ratio of the hydroxyl groups of the alcohol compound to the isocyanate groups of the diisocyanate is about 1/2 to about 1/100, followed by purification to remove an unreacted diisocyanate.

The NCO content (hereinafter also referred to as the "isocyanate content") of the polyisocyanate is not particularly limited, and is preferably 10 mass % or more and 25 mass % or less, more preferably 13 mass % or more and 24 mass % or less, even more preferably 15 mass % or more and 25 mass % or less, yet more preferably 17 mass % or more and 24 mass % or less, and far more preferably 17 mass % or more and 22 mass % or less based on the total amount (100 mass %) of solids. When the isocyanate content is 15 mass % or more, there is a tendency that the crosslink density of the baked coating film is ensured, and good curability is obtained, and when the isocyanate content is 25 mass % or less, the flexibility of the baked coating film is ensured. In order to obtain a polyisocyanate having an NCO content of 15 mass % or more and 25 mass % or less based on the total amount (100 mass %) of solids, a method involving the use of a di- to hexahydric alcohol compound at an appropriate conversion rate or a like method may be used. The NCO content can be measured by the method described in the Examples below.

The NCO group content of the polyisocyanate can also be determined by, for example, reacting the isocyanate groups of the polyisocyanate with an excess of amine (such as dibutylamine) and back-titrating the remaining amine with acid such as hydrochloric acid.

The viscosity of the polyisocyanate is not particularly limited, and is preferably 50 mPa·s or more and 2,000,000 mPa·s or less, more preferably 100 mPa·s or more and 100,000 mPa·s or less, even more preferably 300 mPa·s or more and 50,000 mPa·s or less, and yet more preferably 3,000 mPa·s or more and 50,000 mPa·s or less at 25° C. When the viscosity is 50 mPa·s or more, there is a tendency that good crosslinkability during baking can be ensured, and when the viscosity is 2,000,000 mPa·s or less, there is a tendency that good coating film smoothness after baking can be maintained. Also, when the viscosity is within such a range, sufficient curability and a good coating film appearance tend to be obtained. In order to obtain a polyisocyanate having a viscosity of 100 mPa·s or more and 100,000 mPa·s or less, a method involving the use of a di- to hexahydric alcohol compound at an appropriate conversion rate or a like method may be used. Viscosity can be measured by the method described in the Examples below.

The number average molecular weight of the polyisocyanate is not particularly limited, and is preferably 500 or more and 1500 or less, and more preferably 600 or more and 1300 or less. When the number average molecular weight is 500 or more, there is a tendency that good flexibility of a baked coating film can be ensured, and when the number average molecular weight is 1500 or less, there is a tendency that a good crosslink density of a baked coating film can be ensured. In order to obtain a polyisocyanate having a number average molecular weight of 500 or more and 1500 or less, for example, the conversion rate of the isocyanuration reaction may be 5.0 mass % to 80 mass %. The number average molecular weight can be measured by the method described in the Examples below.

The residual HDI concentration of the polyisocyanate is not particularly limited, and is preferably 2.0 mass % or less, more preferably 1.0 mass % or less, even more preferably 0.7 mass % or less, and yet more preferably 0.5 mass % or less. When the residual HDI concentration is 2.0 mass % or less, there is a tendency that risks during handling can be further reduced, and the curability of a coating material composition can be further improved. In order to obtain a polyisocyanate having a residual HDI concentration of 2.0 mass % or less, HDI may be removed by thin film evaporation, extraction, or the like after polyisocyanate production. The residual HDI concentration can be measured by the method described in the Examples below.

The average number of isocyanate groups of a polyisocyanate formed from one or two or more selected from these polyisocyanates is preferably 2.0 or more and 20 or less. The lower limit of the average number of isocyanate groups is more preferably 2.3, even more preferably 2.5, and yet more preferably 3.0. The upper limit of the average number of isocyanate groups is more preferably 15 and even more preferably 10. When the average number of isocyanate groups is 2.0 or more, there is a tendency that crosslinkability is improved, and low-temperature curability can be exhibited when a blocked polyisocyanate is formed. On the other hand, when the average number of isocyanate groups is 20 or less, there is a tendency that an excessively increased viscosity is suppressed, and a polyisocyanate having good workability can be obtained.

The average number of isocyanate groups can be determined by the following expression. The number average molecular weight and the isocyanate group mass % in the following expression are the above-described number average molecular weight and isocyanate content (mass %), respectively.

$$\text{Average number of isocyanate groups} = \frac{(\text{Number average molecular weight}) \times (\text{Isocyanate group mass \%})}{\text{Formula weight of isocyanate } (42) \times 100}$$

Examples of the polyisocyanate include, but are not particularly limited to, polyisocyanates having one or two or more groups (bonds) selected from the group consisting of a biuret group (bond), a urea group (bond), an isocyanurate group (bond), a uretdione group (bond), a urethane group (bond), an allophanate group (bond), an oxadiazinetrione group, and an iminooxadiazinedione group.

The polyisocyanate having a biuret bond is not particularly limited, and can be obtained by, for example, reacting a so-called biuretizing agent such as water, t-butanol, or urea with a diisocyanate under such conditions that the molar ratio of (the biuretizing agent)/(the isocyanate groups of the diisocyanate) is about 1/2 to about 1/100, and then removing an unreacted diisocyanate. These techniques are disclosed in, for example, Japanese Patent Laid-Open No. 53-106797, Japanese Patent Laid-Open No. 55-11452, and Japanese Patent Laid-Open No. 59-95259.

The polyisocyanate having a urea bond is not particularly limited, and can be formed from, for example, a compound having an isocyanate group and water or a compound having an amine group. The urea bond content in the polyisocyanate is preferably small. Accordingly, there is a tendency that the resulting polyisocyanate is unlikely to aggregate.

The polyisocyanate having an isocyanurate bond is not particularly limited, and can be obtained by, for example, performing an isocyanuration reaction of a diisocyanurate with a catalyst or the like, terminating the reaction when the conversion rate is about 5 to about 80 mass %, and removing an unreacted diisocyanate. The isocyanuration reaction catalyst used at this time is not particularly limited and, specifically, basic isocyanuration reaction catalysts are generally preferable, such as hydroxides of, or salts of organic weak acids such as acetic acid and capric acid of, tetraalkylammoniums such as tetramethylammonium and tetraethylammonium; hydroxides of, or salts of organic weak acids such as acetic acid and capric acid of, hydroxyalkylammoniums such as trimethylhydroxypropylammonium, trimethylhydroxyethylammonium, triethylhydroxypropylammonium, and triethylhydroxyethylammonium; alkali metal salts of tin, zinc, lead, and the like with alkylcarboxylic acids such as acetic acid, caproic acid, octylic acid, and myristic acid; metal alcoholates of sodium, potassium, and the like; aminosilyl group-containing compounds such as hexamethyldisilazane; Mannich bases; tertiary amines and epoxy compounds used in combination; phosphorus-based compounds such as tributyl phosphine; and the like. The amount of these catalysts used is preferably selected from the range of 10 ppm to 1% based on the mass of the starting-material diisocyanate and an optionally added alcohol polyol. Examples of methods for terminating the isocyanuration reaction include a method involving neutralizing the isocyanuration reaction catalyst, and a method involving inactivation by addition of an acidic substance such as phosphoric acid or an acidic phosphate ester, thermal decomposition, or chemical decomposition.

The polyisocyanate having a uretdione bond is not particularly limited, and can be obtained by, for example, using a diisocyanate and a uretdionation reaction catalyst. Specific examples of the uretdionation reaction catalyst include, but are not particularly limited to, tertiary phosphines, e.g., trialkylphosphines such as tri-n-butylphosphine and tri-n-octylphosphine, tris(dialkylamino)phosphines such as tris-(dimethylamino)-phosphine, and cycloalkylphosphines such as cyclohexyl-di-n-hexylphosphine. These compounds can also serve as allophanation reaction catalysts. Also, many of these compounds simultaneously promote an isocyanuration reaction as well, and can generate an isocyanurate group-containing polyisocyanate such as an isocyanurate trimer in addition to a uretdione group-containing polyisocyanate such as a uretdione dimer. Also, a uretdione dimer can be thermally obtained without using a urethodionation reaction catalyst. It is preferable from the viewpoint of storage stability to thermally produce the uretdione group-containing polyisocyanate such as a uretdione dimer of the present embodiment.

The polyisocyanate having a urethane bond is not particularly limited, and can be obtained by, for example, reacting a compound having a hydroxyl group with a diisocyanate such that the equivalent ratio of the hydroxyl group to the isocyanate group (the hydroxyl group/the isocyanate group) is about 1/2 to about 1/100, and then removing an unreacted diisocyanate monomer. The reaction temperature is preferably 20 to 200° C., more preferably 40 to 150° C., and even more preferably 60 to 120° C. from the viewpoint of the reaction rate, suppression of side reactions, and prevention of coloration. The reaction time is preferably 10 minutes to 24 hours, more preferably 15 minutes to 15 hours, and even more preferably 20 minutes to 10 hours from the same viewpoint as the reaction temperature. The urethanation reaction can be performed in the absence of a catalyst or in the presence of a catalyst such as a tin-based catalyst or an amine-based catalyst.

The polyisocyanate having an allophanate group is formed from the hydroxyl group of an alcohol and a compound having an isocyanate group. It is preferable to use an allophanation reaction catalyst for generating an allophanate group. Examples of the allophanation reaction catalyst include, but are not particularly limited to, alkylcarboxylic acid salts of tin, lead, zinc, bismuth, zirconium, zirconyl, and the like. Specific examples include organotin compounds such as tin 2-ethylhexanoate and dibutyltin dilaurate; organolead compounds such as lead 2-ethylhexanoate; organozinc compounds such as zinc 2-ethylhexanoate; organobismuth compounds such as bismuth 2-ethylhexanoate; organozirconium compounds such as zirconium 2-ethylhexanoate; and organozirconyl compounds such as zirconyl 2-ethylhexanoate. Two or more of these can be used in combination as well. The above isocyanuration reaction catalysts can also be used as allophanation reaction catalysts. When an allophanation reaction is performed using an isocyanuration reaction catalyst, an isocyanurate group-containing polyisocyanate may also be generated. Simultaneously performing the allophanation reaction and the isocyanuration reaction using an isocyanuration reaction catalyst as an allophanation reaction catalyst is economical and is thus more preferable in terms of production.

The molar ratio of the allophanate group/the isocyanurate group derived from the alcohol is preferably 1.0% or more and 50% or less, more preferably 1.0% or more and 40% or less, and even more preferably 1.0% or more and 30% or less from the viewpoint of viscosity and curability. The molar ratio of the allophanate group/the isocyanurate group can be measured by $^1$HNMR.

The amount of the alcohol added is preferably 1/1000 or more and 1/10 or less, and more preferably 1/1000 or more and 1/100 or less in terms of the equivalent ratio between the hydroxyl group of the alcohol and the isocyanate group of the diisocyanate. An amount of 1/1000 or more is preferable because the average number of allophanate groups tends to be increased, and the generated blocked polyisocyanate composition tends to have a lower viscosity. An amount of 1/10 or less is preferable because the average number of isocyanate groups is increased, resulting in excellent curability.

The polyisocyanate having an iminooxadiazinedione bond is not particularly limited, and can be obtained by, for example, using a diisocyanate and a specific catalyst or the like. A technique concerning this is disclosed in, for example, Japanese Patent Laid-Open No. 2004-534870.

Polyisocyanates containing a biuret group, an isocyanurate group, a urethane group, or an allophanate group among the above-described bonds are preferable from the viewpoint of weather resistance, heat resistance, curability, and compatibility.

<Blocking Agent>

In the blocked polyisocyanate composition of the present embodiment, the blocking agent thereof contains at least one selected from the group consisting of a malonic acid diester compound represented by formula (I) below (hereinafter also simply referred to as a "malonic acid diester compound") and a β-ketoester compound represented by formula (II) below (hereinafter also simply referred to as a "β-ketoester compound"), and more preferably contains both a malonic acid diester compound and a β-ketoester compound.

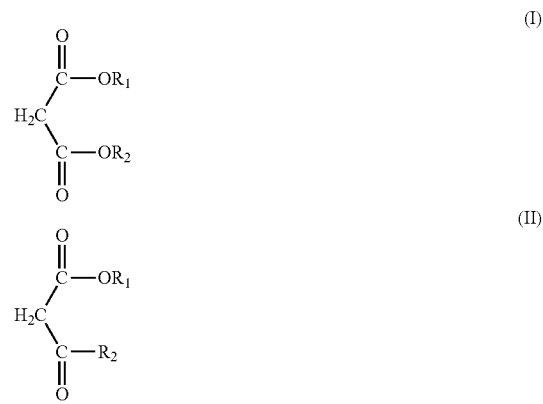

In formula (I) and formula (II), $R_1$ and $R_2$ each independently represent an alkyl group having 1 to 8 carbon atoms, a cycloalkyl group, a phenyl group, or a benzyl group. $R_1$ and $R_2$ may be the same or different, and are preferably the same in terms of availability. When $R_1$ and $R_2$ each represent an alkyl group having 8 or fewer carbon atoms or a cycloalkyl group, there is a tendency that a decrease of the effective NCO content is suppressed and, also, deterioration of compatibility with the main agent and the like when a coating material is formed can be suppressed. Among these, an alkyl group having 1 to 8 carbon atoms is preferable, an alkyl group having 1 to 4 carbon atoms such as a methyl group, an ethyl group, a n-propyl group, an isopropyl group, or a n-butyl group is more preferable, a methyl group or an ethyl group is even more preferable, and an ethyl group is yet more preferable. Here, the effective NCO content is the content (mass %) of potentially existing isocyanates based on the total amount (100 mass %) of the blocked polyisocyanate composition.

In the blocked polyisocyanate composition of the present embodiment, the (terminally located) isocyanate group contained in the polyisocyanate is partially blocked (masked) with a blocking agent.

As a blocking agent, at least one active methylene compound selected from the group consisting of a malonic acid diester compound and a β-ketoester compound is used. When the isocyanate group is blocked with such an active methylene compound, the blocked isocyanate group has an amide structure as represented by general formula (1) below:

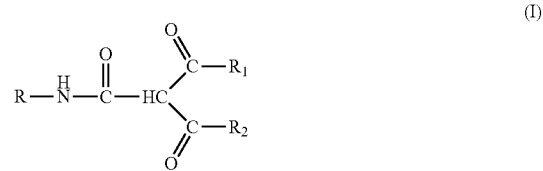

wherein R represents a polyisocyanate residue, $R_1$ and $R_2$ each independently represent at least one selected from an alkyl group and an alkyloxy group, and $R_1$ and $R_2$ may be the same structure or different.

Specific examples of the malonic acid diester compound include, but are not particularly limited to, dimethyl malonate, diethyl malonate, di-n-propyl malonate, diisopropyl malonate, di-n-butyl malonate, diisobutyl malonate, di-t-butyl malonate, a malonic acid methyl t-butyl ester, di-n-hexyl malonate, di-2-ethylhexyl malonate, diphenyl malonate, and dibenzyl malonate. Among these, dimethyl malonate, diethyl malonate, di-n-propyl malonate, diisopropyl malonate, di-n-butyl malonate, diisobutyl malonate, di-t-butyl malonate, a malonic acid methyl t-butyl ester, di-n-hexyl malonate, and di-2-ethylhexyl malonate are preferable. More preferable are dimethyl malonate, diethyl malonate, di-n-propyl malonate, diisopropyl malonate, and di-n-butyl malonate, even more preferable are dimethyl malonate and diethyl malonate, and yet more preferable is diethyl malonate. The malonic acid diesters presented above can be used singly, and can be used as a combination of two or more.

From the viewpoint of low-temperature curability, preferably 50 eq % or more, more preferably 60 eq % or more, and even more preferably 80 eq % or more of the isocyanate groups contained in the polyisocyanate are blocked with the malonic acid diester.

Specific examples of the β-ketoester compound include, but are not particularly limited to, methyl acetoacetate, ethyl acetoacetate, methyl isobutanoylacetate, ethyl isobutanoylacetate, and acetylacetone. Among these, methyl acetoacetate, ethyl acetoacetate, methyl isobutanoylacetate, and ethyl isobutanoylacetate are preferable. More preferable are methyl acetoacetate and ethyl acetoacetate, and even more preferable is ethyl acetoacetate. The β-ketoester compounds presented above can be used singly, and can be used as a combination of two or more.

Examples of the β-ketoester compound also include isopropyl acetoacetate, n-propyl acetoacetate, t-butyl acetoacetate, n-butyl acetoacetate, and phenyl acetoacetate.

From the viewpoint of low-temperature curability and suppression of yellowing, the isocyanate group blocked with the β-ketoester is preferably 50 eq % or less, more preferably 40 eq % or less, and even more preferably 30 eq % or less of the isocyanate group contained in the polyisocyanate.

From the viewpoint of low-temperature curability and suppression of yellowing, the β-ketoester compound is preferably used in 50 eq % or less based on the isocyanate group of the polyisocyanate, more preferably 40 eq % or less, even more preferably 30 eq % or less, and yet more preferably 20 eq % or less.

The malonic diester compound described above is preferably diethyl malonate and, from the viewpoint of more securely providing the intended action and effect of the present invention, the β-ketoester compound described above is preferably an acetoacetic acid ester compound, and more preferably ethyl acetoacetate.

In the blocking agent of the present embodiment, the molar ratio of the malonic acid diester compound to the β-ketoester compound is not particularly limited, and preferably exceeds 1.0. The molar ratio is more preferably 1.5 or more, even more preferably 2.0 or more, and yet more preferably 3.0 or more. The molar ratio is preferably 50 or less, more preferably 33 or less, even more preferably 20 or less, and yet more preferably 10 or less. When the molar ratio exceeds 1.0, there is a tendency that a better low-temperature curability can be attained. On the other hand, when the molar ratio is 50 or less, there is a tendency that crystallinity at low temperatures can be suppressed.

The proportion of the enol form structure in the β-ketoester compound tends to be higher than that in the malonic acid diester compound. Therefore, when the malonic acid diester compound and the β-ketoester compound are used in combination, the molar ratio of the keto form structure to the enol form structure can be adjusted by adjusting the proportions of the respective blocking agents.

The blocking agent of the present embodiment may further contain a blocking agent other than the malonic acid diester compound and the β-ketoester compound (hereinafter also referred to as a "further blocking agent"). A specific example of the further blocking agent is preferably, but is not particularly limited to, a compound having one active hydrogen atom within the molecule. Examples of the compound having one active hydrogen atom within the molecule include, but are not particularly limited to, active methylene-based compounds other than the malonic acid diester compound and the β-ketoester compound, and mercaptan-based, acid amide-based, acid imide-based, imidazole-based, urea-based, oxime-based, amine-based, imide-based, and pyrazole-based compounds.

Examples of the further blocking agent also include alcohol-based, alkylphenol-based, and phenol-based compounds.

More specific examples of the further blocking agent include (1) active methylene-based compounds other than the malonic acid diester compound and the β-ketoester compound: β-ketoester compounds such as methyl isobutanoylacetate and ethyl isobutanoylacetate, acetylacetone, and the like, (2) mercaptan-based compounds: butyl mercaptan, dodecylmercaptan, and the like, (3) acid amide-based compounds: acetanilide, acetic acid amide, ε-caprolactam, δ-valerolactam, γ-butyrolactam, and the like, (4) acid imide-based compounds: succinic acid imide, maleic acid imide, and the like, (5) imidazole-based compounds: imidazole, 2-methylimidazole, and the like, (6) urea-based compounds: urea, thiourea, ethyleneurea, and the like, (7) oxime-based compounds: formaldoxime, acetoaldoxime, acetoxime, methyl ethyl ketoxime (hereinafter abbreviated as MEKO), cyclohexanone oxime, and the like, (8) amine-based compounds: diphenylamine, aniline, carbazole, di-n-propylamine, diisopropylamine, isopropylethylamine, diisobutylamine, di(2-butylamine), di(t-butyl)amine, dicyclohexylamine, N-t-butylcyclohexylamine, 2-methylpiperidine, 2,6-dimethylpiperidine, 2,2,6,6-tetramethylpiperidine, and the like, (9) imine-based compounds: ethyleneimine, polyethyleneimine, and the like, and (10) pyrazole-based compounds: pyrazole, 3-methylpyrazole, 3,5-dimethylpyrazole, and the like.

Among these, a preferable further blocking agent is, but not particularly limited to, at least one selected from oxime-based blocking agents, amine-based blocking agents, acid amide-based blocking agents, active methylene-based blocking agents other than the malonic acid diester compound and the β-ketoester compound, and pyrazole-based blocking agents. More preferable is at least one selected from oxime-based blocking agents, active methylene-based blocking agents other than the malonic acid diester compound and the β-ketoester compound, and pyrazole-based blocking agents, and even more preferable is at least one selected from active methylene-based blocking agents other than the malonic acid diester compound and the β-ketoester compound.

<Monoalcohol Compound>

In the present embodiment, there is no limitation to the monoalcohol compound contained in the blocked polyisocyanate composition. The monoalcohol compound can react with an unreacted (unblocked) isocyanate group of the blocked polyisocyanate or undergo an ester exchange reaction with the terminal ester group of the blocked polyisocyanate.

When the monoalcohol compound is contained in the blocked polyisocyanate composition of the present embodiment, there is a tendency that the crystallization of the blocked polyisocyanate composition can be greatly suppressed.

The number of carbon atoms of the monoalcohol compound is preferably 3 or more and 10 or less, more preferably 4 or more and 9 or less, and even more preferably 4 or more and 8 or less from the viewpoint of storage stability and compatibility when the blocked polyisocyanate composition is mixed with a polyvalent active hydrogen compound to form a thermosetting composition as well as suppressing the crystallinity of the blocked polyisocyanate composition. The boiling point is preferably 200° C. or lower, more preferably 80 to 180° C., and even more preferably 90 to 160° C. from the viewpoint of ease of solvent vaporization and low-temperature curability.

Examples of monoalcohol compounds having such a number of carbon atoms and a boiling point include methanol, ethanol, n-propanol, iso-propanol, n-butanol, iso-butanol, 2-butanol, t-butanol, n-pentanol, iso-pentanol, 2-methyl-1-butanol, n-hexanol, 2-methyl-1-pentanol, 2-ethyl-1-butanol, n-heptanol, n-octanol, 2-ethyl-1-hexanol, methyl cellosolve, ethyl cellosolve, butyl cellosolve, methylcarbitol, propylene glycol monomethyl ether, cyclohexanol, phenol, benzyl alcohol, and the like. One or two or more can be selected and used.

The number of carbon atoms of the monoalcohol compound is preferably greater than the number of carbon atoms of the terminal alkyl group bonded to the malonic acid diester and the β-ketoester from the viewpoint of compatibility between the blocked polyisocyanate composition and the polyvalent active hydrogen compound.

In the present embodiment, the content of the monoalcohol compound in the blocked polyisocyanate composition can be arbitrarily selected, and is preferably 0 to 500 eq % (mol %), more preferably 20 to 400 eq %, and even more preferably 30 to 300 eq % based on the blocked isocyanate group.

When the monoalcohol compound is contained in the blocked polyisocyanate composition, the storage stability and the compatibility of a thermosetting composition containing the blocked polyisocyanate composition and the polyvalent active hydrogen compound are improved. Although specific factors are not clear, it is inferred that the monoalcohol compound reacts with an unreacted isocyanate group contained in the blocked polyisocyanate or undergoes an ester exchange reaction with an ester group contained in the blocked polyisocyanate, it is thus possible to disrupt the structural symmetry of the blocked polyisocyanate, the arrangement of blocked polyisocyanate molecules, and the like, and, accordingly, the blocked polyisocyanate composition becomes unlikely to crystallize. Meanwhile, it is inferred that when the blocked polyisocyanate composition is crystallized, sufficient interactions with the polyvalent active hydrogen compound cannot be attained, resulting in a lowered compatibility, and, accordingly, suppression of crystallization improves compatibility.

In the blocked polyisocyanate composition of the present embodiment, in particular, preferably, the unreacted isocyanate group contained in the blocked polyisocyanate partially forms a urethane bond with the monoalcohol compound, and more preferably, the amount of the urethane bond structure formed from the monoalcohol compound and the isocyanate group is 0.0020 or more and less than 0.50 as a molar proportion expressed as (a)/((a)+(b)+(c)) where (a) is the number of moles of the urethane bond structure, (b) is the number of moles of the bond structure between the isocyanate group and the malonic acid diester compound, and (c) is the number of moles of the bond structure between the isocyanate group and the β-ketoester compound.

From the inventors' research, it was found that when the blocked polyisocyanate partially contains an unreacted isocyanate group that is not blocked and, moreover, that has a urethane bond through a reaction with the monoalcohol compound, crystallization is highly unlikely to occur, and compatibility is superior. Note that the above proportion is preferably 0.01 or more and 0.40 or less, and more preferably 0.02 or more and 0.30 or less.

The monoalcohol compound of the present embodiment refers to a compound capable of reacting with an unreacted isocyanate group in the blocked polyisocyanate of the present embodiment and/or a compound capable of an ester exchange reaction with the terminal alkyl ester residue in the structure of the blocked polyisocyanate. Accordingly, there is a tendency that the crystallization of the blocked polyisocyanate composition of the present embodiment can be suppressed.

The number of carbon atoms of the monoalcohol compound is preferably 3 or more and 10 or less, more preferably 4 or more and 9 or less, and even more preferably 4 or more and 8 or less from the viewpoint of storage stability, compatibility, and suppression of crystallinity. The boiling point is preferably 200° C. or lower, more preferably 80° C. or higher and 180° C. or lower, and even more preferably 90° C. or higher and 160° C. or lower from the viewpoint of ease of solvent vaporization and low-temperature curability.

Examples of the monoalcohol compound having such a number of carbon atoms and/or a boiling point include, but are not particularly limited to, methanol, ethanol, n-propanol, iso-propanol, n-butanol (1-butanol), iso-butanol (isobutanol), 2-butanol, t-butanol, n-pentanol, iso-pentanol, 2-methyl-1-butanol, n-hexanol, 2-methyl-1-pentanol, 2-ethyl-1-butanol, n-heptanol, n-octanol, 2-ethyl-1-hexanol, methyl cellosolve, ethyl cellosolve, butyl cellosolve, methyl carbitol, diethyl carbitol, propylene glycol monomethyl ether, cyclohexanol, phenol, and benzyl alcohol. One or two or more of these can be selected and used.

The amount of the monoalcohol compound added is not particularly limited, and is preferably 10 eq % or more and 500 eq % or less, more preferably 20 eq % or more and 400 eq % or less, and even more preferably 30 eq % or more and 300 eq % or less based on the blocked isocyanate group.

When the monoalcohol compound is contained in the blocked polyisocyanate composition, storage stability and compatibility are improved. Although specific factors are not clear, it is conjectured that the monoalcohol compound reacts with an unreacted isocyanate group or undergoes an ester exchange reaction with a terminal alkyl ester residue in the structure of the blocked polyisocyanate, it is thus possible to disrupt the structural symmetry of the blocked polyisocyanate, the arrangement of the polyisocyanate, and the like, and, accordingly, the blocked polyisocyanate composition of the present embodiment becomes unlikely to crystallize (however, the factors are not limited thereto).

[Method for Producing Blocked Polyisocyanate Composition]

A method for producing the blocked polyisocyanate composition of the present embodiment will now be described. A method for producing the blocked polyisocyanate composition of the present embodiment has two steps, i.e., a first step of obtaining a blocked polyisocyanate from a polyisocyanate derived from at least one diisocyanate selected from the group consisting of an aliphatic diisocyanate and an alicyclic diisocyanate, a malonic acid diester compound, and a blocking agent other than the malonic acid diester compound, and a subsequent second step of subjecting the resulting blocked polyisocyanate and a monoalcohol (a monoalcohol compound) to an ester exchange reaction.

In the first step of the present production method, the malonic acid diester compound, the blocking agent other than the malonic acid diester compound, and a β-ketoester compound may be simultaneously reacted with the polyisocyanate, or any blocking agent may be reacted with the polyisocyanate first, and the remaining blocking agents may be reacted.

The blocking reaction (the reaction between the polyisocyanate and the blocking agents) in the present embodiment is preferably carried out so as to block all isocyanate groups of the polyisocyanate. From this viewpoint, the molar ratio of the blocking agents to the isocyanate groups in the polyisocyanate ((the total number of moles of the blocking agents)/(the number of moles of the isocyanate groups in the polyisocyanate)) is preferably 1.0 or more and 1.5 or less. The lower limit of the molar ratio is more preferably 1.015, even more preferably 1.030, and yet more preferably 1.045. The upper limit of the molar ratio is more preferably 1.35, even more preferably 1.20, and yet more preferably 1.10. When the lower limit of the molar ratio is 1.0, there is a tendency that the low-temperature curability of the blocked polyisocyanate can be more reliably exhibited. On the other hand, when the upper limit of the molar ratio is 1.5 or less, there is a tendency that deterioration of drying properties after coating can be suppressed.

The reaction of the first step can be performed irrespective of the presence or absence of a solvent. In the case of using a solvent, it is preferable to use a solvent that is inert to the isocyanate group. Specific examples of the solvent are not particularly limited, and, for example, solvents are suitably selected and used according to the purpose and the application from the group consisting of aromatic hydrocarbons such as toluene and xylene; ketones such as acetone, methyl ethyl ketone, and methyl isobutyl ketone; esters such as ethyl acetate, n-butyl acetate, and cellosolve acetate; and ethers such as propylene glycol dimethyl ether, dipropylene glycol dimethyl ether, diethylene glycol dimethyl ether, and diethylene glycol diethyl ether. These solvents may be used singly, and may be used as a combination of two or more.

In the blocking reaction of the first step, a reaction catalyst (hereinafter also referred to as a "blocking reaction catalyst" or simply a "catalyst") can be used. Examples of specific reaction catalysts include, but are not particularly limited to, organic metal salts of tin, zinc, lead, and the like; metal alcoholates; and tertiary amines.

The blocking reaction catalyst is preferably a basic compound, and examples include metal alcoholates such as sodium methylate, sodium ethylate, sodium phenolate, and potassium methylate; hydroxides of, and organic weak acid salts such as acetates, octylates, myristates, and benzoates of, tetraalkylammoniums such as tetramethylammonium, tetraethylammonium, and tetrabutylammonium; alkali metal salts of alkylcarboxylic acids such as acetic acid, caproic acid, octylic acid, and myristic acid; metal salts of tin, zinc, lead, and the like with alkylcarboxylic acids such as acetic acid, caproic acid, octylic acid, and myristic acid; aminosilyl group-containing compounds such as hexamethylenedisilazane; hydroxides of alkali metals such as lithium, sodium, and potassium; and the like.

The amount of the catalyst added is not limited, and is generally 0.01 to 5 mass %, preferably 0.05 to 3 mass %, and particularly preferably 0.1 to 2 mass % based on the polyisocyanate. When the amount of the catalyst added is small, there is a tendency that the amount of isocyanate groups that remain unblocked during the blocking reaction is increased. The reaction between the polyisocyanate and the active methylene-based compound can be performed irrespective of the presence or absence of a solvent.

In the blocked polyisocyanate composition of the present embodiment, in order to adjust the molar ratio of the keto form structure to the enol form structure and to ensure the amount of the methanetetracarbonyl structure generated, it is preferable to continuously add the reaction catalyst over time. The time taken to add the reaction catalyst dropwise is preferably 2.0 minutes or longer and 120 minutes or shorter. The lower limit of the time is more preferably 3.0 minutes, even more preferably 4.0 minutes, and yet more preferably 5.0 minutes. The upper limit of the time is more preferably 90 minutes, even more preferably 60 minutes, and yet more preferably 30 minutes. When the lower limit of the time is 2.0 minutes or longer, there is a tendency that the content of the enol form structure in terms of a molar ratio can be increased when the malonic acid diester compound is used in a large proportion as a blocking agent, and also there is a tendency that the amount of the methanetetracarbonyl structure generated is increased and is thus easily adjusted to the range of the present embodiment. On the other hand, when the upper limit of the time is 120 minutes or shorter, there is a tendency that an excessively high content of the enol form structure in terms of a molar ratio can be avoided, also the amount of the methanetetracarbonyl structure generated does not become excessive and can be easily adjusted to the range of the present embodiment, and moreover a prolonged reaction time can be suppressed. When the reaction catalyst that has been mixed with the blocking agents is added to the polyisocyanate, there is a tendency that the content of the keto form structure is extremely high.

When there is a possibility that the reaction catalyst to be used adversely affects the coating material or coating film properties, it is preferable to deactivate the reaction catalyst with an acidic compound or the like. Specific examples of the acidic compound in this case include, but are not particularly limited to, inorganic acids such as hydrochloric acid, phosphorous acid, and phosphoric acid; sulfonic acids or derivatives thereof such as methanesulfonic acid, p-toluenesulfonic acid, a p-toluenesulfonic acid methyl ester, and a p-toluenesulfonic acid ethyl ester; and monoethyl phosphate, diethyl phosphate, monoisopropyl phosphate, diisopropyl phosphate, monobutyl phosphate, dibutyl phosphate, mono(2-ethylhexyl) phosphate, di(2-ethylhexyl) phosphate, monoisodecyl phosphate, diisodecyl phosphate, oleyl acid phosphate, tetracosyl acid phosphate, ethylglycol acid phosphate, butyl pyrophosphate, and butyl phosphite. These acidic compounds can be used singly, and can be used as a combination of two or more.

The reaction temperature of the first step is preferably −20° C. or higher and 150° C. or lower, more preferably 0° C. or higher and 120° C. or lower, and even more preferably 40° C. or higher and 100° C. or lower from the viewpoint of suppressing side reactions and reaction efficiency. By performing the reaction at a reaction temperature of 150° C. or lower, there is a tendency that side reactions can be suppressed, and the amount of isocyanate groups remaining unblocked during the blocking reaction is increased. By performing the reaction at a reaction temperature of −20° C. or higher, there is a tendency that a high reaction rate can be maintained.

The reaction time of the polyisocyanate and the blocking agents can be generally 0.1 to 6 hours, and from the viewpoint of optimizing the amount of the urethane bond structure generated, is preferably 0.5 to 4 hours. When the reaction time is short, there is a tendency that the amount of isocyanate groups remaining unblocked during the blocking reaction is increased.

The reaction temperature and the reaction time are also preferably, for example, 50 to 180° C. and 10 to 480 minutes, respectively.

Next, the second step will now be described. The second step is a step of reacting the blocked polyisocyanate obtained in the first step with a monoalcohol compound.

It is preferable to perform the second step as a step of mixing and reacting the blocked polyisocyanate composition and a monoalcohol compound in order to improve storage stability when the blocked polyisocyanate composition of the present embodiment is blended with at least one selected from the group consisting of polyols, polyamines, and alkanolamines.

The mixing temperature of the second step is preferably −20° C. or higher and 150° C. or lower, more preferably 0° C. or higher and 120° C. or lower, and even more preferably 40° C. or higher and 100° C. or lower. By performing the reaction at a mixing temperature of 150° C. or lower, there is a tendency that side reactions can be suppressed. By performing the reaction at a mixing temperature of −20° C. or higher, there is a tendency that the mixing time can be shortened.

By heating the blocked polyisocyanate obtained in the first step in the presence of a monoalcohol compound, an unreacted isocyanate group of the blocked polyisocyanate reacts with active hydrogen in the monoalcohol compound, and a blocked polyisocyanate composition having increased storage stability can be obtained.

In the present embodiment, when reacting the polyisocyanate to be blocked with the blocking agents, some isocyanate groups are left unreacted such that a urethane bond is formed between an unreacted isocyanate group and a monoalcohol compound in the blocked polyisocyanate composition.

Examples of methods that leave unblocked isocyanate groups include a method in which the amount of the blocking agents to be added is made smaller than the molar amount of the isocyanate groups of the polyisocyanate beforehand, a method in which the amount of the blocking reaction catalyst to be added is controlled, a method in which the reaction temperature or the reaction time is controlled, and the like. These methods may be used singly, or may be combined.

It is also possible to adopt a method involving simultaneously adding the blocking agents and the monoalcohol compound to form a urethane bond between the isocyanate group of the blocked polyisocyanate and the monoalcohol compound.

By methods as described above, it is possible to generate a blocked polyisocyanate composition in which an unreacted isocyanate group in the blocked polyisocyanate and the monoalcohol compound form a urethane bond.

In the present embodiment, by heating the blocked polyisocyanate in the presence of a monoalcohol compound having an alkyl group having 4 or more carbon atoms, there is a tendency that an ester exchange reaction is promoted, and storage stability is improved. Moreover, by thermally removing at the same time the alcohol eliminated by the ester exchange reaction, there is a tendency that the proportion of alkyl groups having 4 or more carbon atoms accounting for $R_1$ and $R_2$ in formula (V) can be adjusted to the range of the present embodiment, and storage stability and compatibility are improved.

The heating condition for promoting the ester exchange reaction may be a condition where the ester exchange reaction between $R_1$ and $R_2$ in formula (V) occurs, and can be adjusted according to the desired temperature and time. However, a preferable heating temperature is −20° C. or higher and 150° C. or lower, and more preferably 50° C. or higher and 100° C. or lower. A preferable heating time is 0.2 hours and longer and 8 hours or shorter, and more preferably 0.5 hours or longer and 5 hours or shorter.

The blocked polyisocyanate composition produced through the above steps can simultaneously achieve low-temperature curability, storage stability, and compatibility.

On the other hand, separately a blocked polyisocyanate containing a large amount of a methanetetracarbonyl structure may be mixed with a blocked polyisocyanate produced from a polyisocyanate derived from at least one diisocyanate selected from the group consisting of an aliphatic diisocyanate and an alicyclic diisocyanate, a malonic acid diester compound, and optionally a blocking agent other than the malonic acid diester compound, to produce a blocked polyisocyanate composition. An example is a method involving mixing, as a third step, a separately produced blocked polyisocyanate having a high methanetetracarbonyl structure content with a blocked polyisocyanate obtained through steps similar to the first step and the second step, to adjust the overall methanetetracarbonyl structure content of the resulting blocked polyisocyanate composition.

The separately produced blocked polyisocyanate having a high methanetetracarbonyl structure content can be produced by performing a step similar to the first step of Production Method 1 at a molar ratio of the malonic acid diester compound to the isocyanate group of the polyisocyanate of 0.5 or more and 0.9 or less. The lower limit of the molar ratio is more preferably 0.55, even more preferably 0.60, and yet more preferably 0.65. The upper limit of the molar ratio is more preferably 0.85, even more preferably 0.80, and yet more preferably 0.75. When the lower limit of the molar ratio is 0.5 or more, there is a tendency that gelation during the course of reaction can be suppressed, and when the upper limit of the molar ratio is 1.0 or less, there is a tendency that the amount of the methanetetracarbonyl structure generated can be increased.

The blocked polyisocyanate having a high methanetetracarbonyl structure content is preferably mixed and reacted with a monoalcohol compound as a step similar to the second step after being reacted with the polyisocyanate and the malonic acid diester compound.

The average number of isocyanate groups of the polyisocyanate used in the blocked polyisocyanate having a high methanetetracarbonyl structure content is preferably 1.0 or more and 4.0 or less. The lower limit of the average number of isocyanate groups is more preferably 1.5, even more preferably 1.7, and yet more preferably 1.9. The upper limit of the average number of isocyanate groups is more preferably 3.0, even more preferably 2.5, and yet more preferably 2.0. When the lower limit of the average number of isocyanate groups is 1.0 or more, there is a tendency that the proportion of the methanetetracarbonyl structure generated can be increased, and when the upper limit of the average number of isocyanate groups is 4.0 or less, there is a tendency that gelation during the production of the methanetetracarbonyl structure can be suppressed.

The mixing temperature of the third step is preferably −20° C. and higher and 150° C. or lower, more preferably 0° C. and higher and 100° C. or lower, and more preferably 40° C. or higher and 80° C. or lower. By mixing at a mixing temperature of 150° C. or lower, there is a tendency that side reactions can be suppressed, and by mixing at −20° C. or higher, there is a tendency that the mixing time can be shortened.

(Additives)

Various organic solvents can be added as additives to the blocked polyisocyanate composition of the present embodiment according to the purpose and the application.

Examples of the organic solvents to be added include, but are not particularly limited to, aliphatic hydrocarbon-based solvents such as hexane, heptane, and octane; alicyclic hydrocarbon-based solvents such as cyclohexane and methylcyclohexane; ketone-based solvents such as acetone, methyl ethyl ketone, methyl isobutyl ketone, and cyclohexanone; ester-based solvents such as methyl acetate, ethyl acetate, butyl acetate, isobutyl acetate, methyl lactate, and ethyl lactate; aromatic solvents such as toluene, xylene, diethylbenzene, mesitylene, anisole, benzyl alcohol, phenylglycol, and chlorobenzene; glycol-based solvents such as ethylene glycol monoethyl ether acetate, 3-methyl-3-methoxy butyl acetate, dipropylene glycol monomethyl ether, and propylene glycol monomethyl ether; ether-based solvents such as diethyl ether, tetrahydrofuran, and dioxane; halogenated hydrocarbon-based solvents such as dichloromethane, 1,2-dichloroethane, and chloroform; pyrrolidone-based solvents such as N-methyl-2-pyrrolidone; amide-based solvents such as N,N-dimethylacetamide and N,N-dimethylformamide; sulfoxide-based solvents such as dimethylsulfoxide; lactone-based solvents such as γ-butyrolactone; amine-based solvents such as morpholine; and mixtures thereof.

Moreover, a different blocked polyisocyanate composed of a multimer of a diisocyanate other than the aliphatic and alicyclic diisocyanates may be added in an appropriate proportion to the blocked polyisocyanate composition of the present embodiment. At this time, the bonded blocking agent may have the same structure as or a different structure from that of the above blocked polyisocyanate.

The blocked polyisocyanate composition of the present embodiment can contain various additives according to the purpose and the application, such as a curing accelerating catalyst, an antioxidant, an ultraviolet absorber, a light stabilizer, a pigment, a leveling agent, a plasticizer, a rheology controlling agent, and a surfactant.

Examples of the curing accelerating catalyst include, but are not particularly limited to, tin-based compounds such as dibutyltin dilaurate, dibutyltin diacetate, dioctyltin dilaurate, dimethyltin dineodecanoate, and tin bis(2-ethylhexanoate); zinc compounds such as zinc 2-ethylhexanoate and zinc naphthenate; titanium compounds such as titanium 2-ethylhexanoate and titanium diisopropoxy bis(ethylacetonate); cobalt compounds such as cobalt 2-ethylhexanoate and cobalt naphthenate; bismuth compounds such as bismuth 2-ethylhexanoate and bismuth naphthenate; zirconium compounds such as zirconium tetraacetylacetonate, zirconyl 2-ethylhexanoate, and zirconyl naphthenoate; amine compounds; and the like.

Examples of the antioxidant include, but are not particularly limited to, hindered phenol-based compounds, phosphorus-based compounds, sulfur-based compounds, and the like.

Examples of the ultraviolet absorber include, but are not particularly limited to, benzotriazole-based compounds, triazine-based compounds, benzophenone-based compounds, and the like.

Examples of the light stabilizer include, but are not particularly limited to, hindered amine-based compounds, benzotriazole-based compounds, triazine-based compounds, benzophenone-based compounds, benzoate-based compounds, and the like.

Examples of the pigment include, but are not particularly limited to, titanium oxide, carbon black, indigo, quinacridone, pearl mica, aluminum, and the like.

Examples of the leveling agent include, but are not particularly limited to, silicone oil and the like.

Examples of the plasticizer include, but are not particularly limited to, phthalic acid esters, phosphoric acid-based compounds, polyester-based compounds, and the like.

Examples of the rheology controlling agent include, but are not particularly limited to, hydroxyethyl cellulose, urea compounds, microgel, and the like.

Examples of the surfactant include, but are not particularly limited to, known anionic surfactants, cationic surfactants, amphoteric surfactants, and the like.

In the polyisocyanate composition and the blocked polyisocyanate composition according to the present embodiment, the content of the further additives described above is preferably 0 to 80 mass %, more preferably 0 to 70 mass %, and even more preferably 0 to 60 mass %.

[One-Component Coating Composition]

The one-component coating composition of the present embodiment contains the blocked polyisocyanate composition of the present embodiment and at least one of a polyol, a polyamine, and an alkanolamine. The one-component coating composition preferably contains at least a polyol. In order to improve the storage stability of the one-component coating composition, the blocked polyisocyanate composition of the present embodiment preferably further contains the monoalcohol compound described above.

The blocked polyisocyanate composition is preferably a main constituent of the one-component coating composition as with the at least one of a polyol, a polyamine, and an alkanolamine.

Specific examples of the polyol include, but are not particularly limited to, polyester polyol, acrylic polyol, polyether polyol, polyolefin polyol, fluorine polyol, polycarbonate polyol, and polyurethane polyol.

Examples of the polyester polyol include, but are not particularly limited to, polyester polyols obtained by a condensation reaction of a single form or a mixture of dibasic acid selected from the group of carboxylic acids such as succinic acid, adipic acid, sebacic acid, dimer acid, maleic anhydride, phthalic anhydride, isophthalic acid, and terephthalic acid with a single form or a mixture of polyhydric alcohol selected from the group of ethylene glycol, propylene glycol, diethylene glycol, neopentyl glycol, trimethylolpropane, and glycerin; and polycaprolactones obtained by ring-opening polymerization of ε-caprolactone using a polyhydric alcohol.

The acrylic polyol is not particularly limited, and is obtained by, for example, copolymerizing a single form or a mixture of an ethylenically unsaturated bond-containing monomer having a hydroxyl group with a single form or a mixture of another ethylenically unsaturated bond-containing monomer that is copolymerizable therewith.

Examples of the polyether polyol include, but are not particularly limited to, polyether polyols obtained by adding a single form or a mixture of alkylene oxide such as ethylene oxide, propylene oxide, butylene oxide, cyclohexene oxide, or styrene oxide to a single form or a mixture of a polyhydroxy compound using, for example, a strongly basic catalyst such as a hydroxide of lithium, sodium, potassium, or the like, an alcoholate, or an alkylamine; polyether polyols obtained by reacting a polyfunctional compound such as ethylenediamine with alkylene oxide; and so-called polymeric polyols obtained by polymerizing acrylamide or the like using these polyether polyols as media.

Examples of the polyolefin polyol include, but are not particularly limited to, polybutadiene, hydrogenated polybutadiene, polyisoprene, and hydrogenated polyisoprene having two or more hydroxyl groups. The number of hydroxyl groups (the average number of hydroxyl groups) possessed by statistically one molecule of the polyol is preferably 2.0 or more. When the average number of hydroxyl groups of the polyol is 2.0 or more, there is a tendency that a decrease of the crosslink density of the resulting coating film can be suppressed.

The fluorine polyol is a polyol containing fluorine within the molecule, and examples include, but are not particularly limited to, copolymers of fluoroolefin, cyclovinyl ether, hydroxyalkyl vinyl ether, monocarboxylic acid vinyl ester, and the like disclosed in Japanese Patent Laid-Open No. 57-34107 and Japanese Patent Laid-Open No. 61-275311.

Examples of the polycarbonate polyol include, but are not particularly limited to, those obtained by polycondensing low-molecular carbonate compounds such as dialkyl carbonates such as dimethyl carbonate, alkylene carbonates such as ethylene carbonate, and diaryl carbonates such as diphenyl carbonate with low-molecular polyols used in the polyester polyols described above.

The polyurethane polyol is not particularly limited, and can be obtained by, for example, reacting a polyol with a polyisocyanate.

The hydroxyl value per resin of the polyol is preferably 10 mg KOH/g of resin or more and 300 mg KOH/g of resin or less. When the hydroxyl value per resin is 10 mg KOH/g of resin or more, there is a tendency that a decrease of the crosslink density is suppressed, and the physical properties intended by the present embodiment can be sufficiently achieved. On the other hand, when the hydroxyl value per resin is 300 mg KOH/g of resin or less, there is a tendency that an excessive increase of the crosslink density is suppressed, and the mechanical properties of the coating film can be maintained at a high level.

The acid value per resin of the polyol is preferably 5.0 mg KOH/g of resin or more and 150 mg KOH/g of resin or less, more preferably 8.0 mg KOH/g of resin or more and 120 mg KOH/g of resin or less, and even more preferably 10 mg KOH/g of resin or more and 100 mg KOH/g of resin or less. When the acid value is 5.0 mg KOH/g of resin or more, there is a tendency that high water dispersibility can be maintained, and when the acid value is 150 mg KOH/g of resin or less, there is a tendency that a decrease of the water resistance of the coating film can be suppressed.

Among the polyols listed above, acrylic polyol and polyester polyol are more preferable. In the coating material composition when a polyol is used, the equivalent ratio between the blocked isocyanate groups and the hydroxyl groups of the polyol is preferably set at 10:1 to 1:10.

The polyamine herein is preferably a polyamine having two or more primary amino groups or secondary amino groups within one molecule, and in particular, a polyamine having three or more within one molecule is more preferable.

The alkanolamine herein means a compound having an amino group and a hydroxyl group within one molecule. Examples of the alkanolamine include, but are not particularly limited to, monoethanolamine, diethanolamine, aminoethylethanolamine, N-(2-hydroxypropyl)ethylenediamine, mono-, di- (n- or iso-)propanolamine, ethylene glycol-bis-propylamine, neopentanolamine, and methylethanolamine.

A known melamine resin, epoxy resin, or polyurethane resin can also be contained in the one-component coating composition containing the blocked polyisocyanate composition of the present embodiment. When the above-described polyol has a carboxyl group, an oxazoline group-containing compound and a carbodiimide group-containing compound can be contained. When the above-described polyol has a carbonyl group, a hydrazide group-containing compound and a semicarbazide group-containing compound can be contained. Not only can one of these compounds be blended singly, but also two or more compounds can be blended.

As necessary, the one-component coating composition of the present embodiment may contain an antioxidant such as hindered phenol, an ultraviolet absorber such as benzotriazole or benzophenone, a pigment such as titanium oxide, carbon black, indigo, quinacridone, or pearl mica, a metallic flake pigment such as aluminum, a rheology controlling agent such as hydroxyethyl cellulose, a urea compound, or microgel, or a curing accelerator such as a tin compound, a zinc compound, or an amine compound.

[Coated Article]

The article to be coated of the present embodiment is coated with the one-component coating composition of the present embodiment. For example, substances, e.g., metals such as steel plates and surface-treated steel plates, plastics, and inorganic materials are suitably coated with the one-component coating composition of the present embodiment as a primer, an intermediate coat, or a top coat by way of roll coating, curtain flow coating, spray coating, electrostatic coating, bell coating, or the like, and thus coated articles are obtained. The one-component coating composition is suitably used to impart aesthetics, weather resistance, acid resistance, corrosion resistance, chipping resistance, adhesion, and the like to precoated metals including anticorrosive steel plates, automobile coatings, plastic coatings, and the like. The one-component coating composition is also useful as a urethane starting material for adhesives, pressure sensitive adhesives, elastomers, foams, surface treatment agents, and the like.

[Coating Film]

The coating film of the present embodiment is formed of the one-component coating composition of the present embodiment. That is to say, the one-component coating composition of the present embodiment can be formed into the coating film of the present embodiment via coating by roll coating, curtain flow coating, spray coating, electrostatic coating, bell coating, or the like and then a baking step. The one-component coating composition used for forming the coating film preferably undergoes a baking step to form a crosslinked coating film. The crosslinked coating film after curing the one-component coating composition has not only a urethane bond derived from a polyisocyanate before a blocking reaction but also a polar group such as an amide bond or an ester bond derived from a blocked isocyanate group. Accordingly, the crosslinked coating film formed from the one-component coating composition of the present embodiment has excellent interlayer adhesion because interlayer hydrogen bonding and the like can be attained when performing layer-coating or recoating in addition to having chemical resistance, heat resistance, water resistance, and the like that are characteristics of commonly used urethane crosslinked coating films. Similar to the crosslinked coating film, a coating film in which a crosslinked structure is not completely formed after the baking step also has excellent adhesion when layer-coated or recoated because the coating film has the above polar group.

When several layers of coating liquids are applied one on top of the other on a wet-on-wet basis as in the coating in the assembly line of brand-new automobiles, the coating film may serve as a catalyst of a crosslinking reaction with a lower layer or an upper layer due to the presence of an organoamine compound in the coating material composition of the present embodiment or in the crosslinked coating film after curing.

[Thermosetting Composition, Cured Product]

The thermosetting composition of the present embodiment contains the blocked polyisocyanate composition and a polyvalent active hydrogen compound. A cured product can be obtained by thermally curing the thermosetting composition. Specifically, the thermosetting composition of the present embodiment can be produced by mixing the blocked polyisocyanate composition with a polyvalent active hydrogen compound. Also, heating the thermosetting composition of the present embodiment causes a blocked polyisocyanate and active hydrogen in the polyvalent active hydrogen compound to undergo an ester exchange reaction, and a cured product can be obtained.

The thermosetting composition is obtained by mixing the blocked polyisocyanate composition as a main agent with a polyvalent active hydrogen compound. The cured product can be obtained by heating the thermosetting composition of the present embodiment to cause the reaction product of the above-described polyisocyanate composition and the above-described malonic acid diester or β keto ester compound to undergo an ester exchange reaction with active hydrogen in the polyvalent active hydrogen compound.

Below, the polyvalent active hydrogen compound and the like that can be used in the thermosetting composition according to the present embodiment will now be described.

The polyvalent active hydrogen compound of the present embodiment is a compound in which two or more active hydrogen atoms are bonded within the molecule. Examples of the active hydrogen compound include, but are not particularly limited to, a polyol, a polyamine, an alkanolamine, and a polythiol, and a polyol is preferable.

Examples of the polyamine include, but are not particularly limited to, diamines such as ethylenediamine, propylenediamine, butylenediamine, triethylenediamine, hexamethylenediamine, 4,4'-diaminodicyclohexylmethane, piperazine, 2-methylpiperazine, and isophoronediamine; chain polyamines having three or more amino groups such as bishexamethylenetriamine, diethylenetriamine, triethylenetetramine, tetraethylenepentamine, pentamethylenehexamine, and tetrapropylenepentamine; and cyclic polyamines such as 1,4,7,10,13,16-hexaazacyclooctadecane, 1,4,7,10-tetraazacyclodecane, 1,4,8,12-tetraazacyclopentadecane, and 1,4,8,11-tetraazacyclotetradecane.

Examples of the alkanolamine include, but are not particularly limited to, monoethanolamine, diethanolamine, triethanolamine, aminoethylethanolamine, N-(2-hydroxypropyl)ethylenediamine, mono- or di- (n- or iso-) propanolamine, ethylene glycol-bis-propylamine, neopentanolamine, methylethanolamine, and the like.

Examples of the polythiol include, but are not particularly limited to, bis-(2-hydrothioethyloxy)methane, dithioethylene glycol, dithioerythritol, dithiothreitol, and the like.

Examples of the polyol include, but are not particularly limited to, polyester polyol, acrylic polyol, polyether polyol, polyolefin polyol, fluorine polyol, polycarbonate polyol, polyurethane polyol, and epoxy resin.

Examples of the polyester polyol include, but are not particularly limited to, polyester polyol and polycaprolactone. The polyester polyol is not particularly limited, and can be obtained by, for example, a condensation reaction of a single form or a mixture of dibasic acid with a single form or a mixture of polyhydric alcohol. Examples of the dibasic acid include, but are not particularly limited to, one or two or more dibasic acids selected from the group consisting of succinic acid, adipic acid, sebacic acid, dimer acid, maleic anhydride, phthalic anhydride, isophthalic acid, and terephthalic acid. Examples of the polyhydric alcohol include, but are not particularly limited to, one or two or more polyhydric alcohols selected from the group consisting of ethylene glycol, propylene glycol, diethylene glycol, neopentyl glycol, trimethylolpropane, and glycerin. The polycaprolactone is not particularly limited, and can be obtained by, for example, ring-opening polymerization of ε-caprolactone using a polyhydric alcohol.

Example of the acrylic polyol include, but are not particularly limited to, those obtained by copolymerizing a single form or a mixture of an ethylenically unsaturated bond-containing monomer having a hydroxyl group with a single form or a mixture of another ethylenically unsaturated bond-containing monomer that is copolymerizable therewith.

Examples of the polyether polyol include, but are not particularly limited to, polyether polyols obtained by adding a single form or a mixture of alkylene oxide such as ethylene oxide, propylene oxide, butylene oxide, cyclohexene oxide, or styrene oxide to a single form or a mixture of a polyhydroxy compound using a strongly basic catalyst such as a hydroxide of lithium, sodium, potassium, or the like, an alcoholate, or an alkylamine; polyether polyols obtained by reacting a polyfunctional compound such as ethylenediamine with alkylene oxide; and so-called polymeric polyols obtained by polymerizing acrylamide or the like using the above polyethers as media.

Examples of the polyolefin polyol include, but are not particularly limited to, polybutadiene, hydrogenated polybutadiene, polyisoprene, and hydrogenated polyisoprene that have two or more hydroxyl groups.

Examples of the fluorine polyol include, but are not particularly limited to polyols containing fluorine within the molecule, such as copolymers of fluoroolefin, cyclovinyl ether, hydroxyalkyl vinyl ether, monocarboxylic acid vinyl ester, and the like disclosed in Japanese Patent Laid-Open No. 57-34107 and Japanese Patent Laid-Open No. 61-275311.

Examples of the polycarbonate polyol include, but are not particularly limited to, those obtained by polycondensing low-molecular carbonate compounds such as dialkyl carbonates such as dimethyl carbonate, alkylene carbonates such as ethylene carbonate, and diaryl carbonates such as diphenyl carbonate, with low-molecular polyols used for the polyester polyols described above.

The polyurethane polyol can be obtained by, for example, reacting a polyol with a polyisocyanate according to an ordinary method.

The epoxy resin is not particularly limited as long as it is a resin having two or more epoxy groups within one molecule, and those that are known per-se can be used. Examples of the epoxy resin include bisphenol-type epoxy resins obtained by adding epichlorohydrin to bisphenol, novolac-type epoxy resins obtained by adding epichlorohydrin to a phenol novolac resin, polyethylene glycol diglycidyl ether, and the like. The epoxy resin can be used as a water dispersion as necessary.

Among the polyols listed above, acrylic polyol and polyester polyol are preferable.

The hydroxyl value of the polyol is preferably 10 mg KOH/g or more and 300 mg KOH/g or less per resin from the viewpoint of the crosslink density, and the mechanical properties of the cured product. When the hydroxyl value per resin is 10 mg KOH/g of resin or more, there is a tendency that a decrease of the crosslink density is suppressed, and the physical properties intended by the present embodiment can be sufficiently achieved. On the other hand, when the hydroxyl value per resin is 300 mg KOH/g of resin or less, there is a tendency that an excessive increase of the crosslink density is suppressed, and the mechanical properties of the coating film can be maintained at a high level. The hydroxyl value can be determined by a titration method.

In the curable composition of the present embodiment, the molar ratio between the blocked isocyanate group and the active hydrogen group (the isocyanate group:the active hydrogen group) is preferably set at 10:1 to 1:10.

The curable composition of the present embodiment can further contain another curing agent such as a melamine-based curing agent or an epoxy-based curing agent.

Examples of the melamine-based curing agent include, but are not particularly limited to, fully alkyl-etherified melamine resin, methylol group-type melamine resin, and imino group-type melamine resin partially having an imino group.

When the melamine-based curing agent is used together as a curing agent, it is effective to also add an acidic compound. Specific examples of the acidic compound include, but are not particularly limited to, carboxylic acids, sulfonic acids, acidic phosphoric acid esters, and phosphorous acid esters.

Examples of the carboxylic acids include, but are not particularly limited to, acetic acid, lactic acid, succinic acid, oxalic acid, maleic acid, and decanedicarboxylic acid.

Examples of the sulfonic acids include, but are not particularly limited to, paratoluenesulfonic acid, dodecylbenzenesulfonic acid, and dinonylnaphthalenedisulfonic acid.

Examples of the acidic phosphoric acid esters include, but are not particularly limited to, dimethyl phosphate, diethyl phosphate, dibutyl phosphate, dioctyl phosphate, dilauryl phosphate, monomethyl phosphate, monoethyl phosphate, monobutyl phosphate, and monooctyl phosphate.

Examples of the phosphorous acid esters include, but are not particularly limited to, diethyl phosphite, dibutyl phosphite, dioctyl phosphite, dilauryl phosphite, monoethyl phosphite, monobutyl phosphite, monooctyl phosphite, and monolauryl phosphite.

Examples of the epoxy-based curing agent include, but are not particularly limited to, aliphatic polyamine, alicyclic polyamine, aromatic polyamine, acid anhydride, phenol novolac, polymercaptan, aliphatic tertiary amine, aromatic tertiary amine, imidazole compounds, and Lewis acid complexes.

Examples of the epoxy-based curing agent include, but are not particularly limited to, aliphatic polyamine, alicyclic polyamine, aromatic polyamine, acid anhydride, phenol novolac, polymercaptan, aliphatic tertiary amine, aromatic tertiary amine, imidazole compounds, and Lewis acid complexes.

[Applications]

The blocked polyisocyanate composition of the present embodiment can be used as, for example, a curable composition such as a coating material composition, a pressure sensitive adhesive composition, an adhesive composition, and a casting agent composition; a surface treatment agent composition such as a fiber treatment agent; an elastomer composition; a crosslinking agent for a foam composition and the like; a modifier; and an additive.

The coating material composition containing the blocked polyisocyanate composition of the present embodiment is suitably used as a primer, an intermediate coat, or a top coat on various substances by way of roll coating, curtain flow coating, spray coating, electrostatic coating, bell coating, or the like. Also, the coating material composition is suitably used to impart aesthetics, weather resistance, acid resistance, corrosion resistance, chipping resistance, adhesion, and the like to precoated metals including anticorrosive steel plates, automobile coatings, plastic coatings, and the like.

The fields where the pressure sensitive adhesive composition and the adhesive composition containing the blocked polyisocyanate composition of the present embodiment are used include automobiles, building materials, household electrical appliances, woodcraft, laminates for solar cells, and the like. In particular, in order to serve various functions, films and plates of various adherends for optical components for, for example, liquid crystal displays of household electrical appliances such as televisions, personal computers, digital cameras, and cell phones need to be layered. Materials for use between films and plates of various adherends are required to have sufficient tackiness or adhesion, and are therefore preferred exemplary applications of the pressure sensitive adhesive composition and the adhesive composition containing the blocked polyisocyanate composition of the present embodiment.

Examples of adherends for which the curable composition containing the blocked polyisocyanate composition of the present embodiment and the like can be used include, but are not particularly limited to glass; various metals such as aluminum, iron, galvanized steel plate, copper, and stainless steel; porous materials such as wood, paper, mortar, and stone; materials furnished with fluorine coating, urethane coating, acrylic urethane coating, or the like; sealant cured materials such as silicone-based cured materials, modified silicone-based cured materials, and urethane-based cured materials; rubbers such as vinyl chloride, natural rubber, and synthetic rubber; leathers such as natural leather and artificial leather; fibers such as vegetable fiber, animal fiber, carbon fiber, and glass fiber; nonwoven fabric, and films and plates of resins such as polyester, acryl, polycarbonate, triacetyl cellulose, and polyolefin; inks such as a ultraviolet-curable acrylic resin layer, printing ink, and UV ink; and the like.

EXAMPLES

Below, the present embodiment will now be described in more detail by way of Examples, but the present embodiment is not limited to these Examples. Below, methods for measuring and evaluating various physical properties will now be described.

(Physical Property 1) NCO Content (Mass %)

The NCO content (isocyanate content, mass %) of a polyisocyanate was measured as follows. First, 1 to 3 g (Wg) of a polyisocyanate produced in a Production Example was precisely weighed into an Erlenmeyer flask, 20 mL of toluene was added, and the polyisocyanate was completely dissolved. Thereafter, 10 mL of a solution of 2 N di-n- butylamine in toluene was added and completely mixed, and then the mixture was left to stand for 15 minutes at room temperature. Moreover, 70 mL of isopropyl alcohol was added to this solution and completely mixed. This solution was titrated with 1 N hydrochloric acid solution (factor F) using an indicator, and thus a titration value $V_2$ mL was obtained. The same titration operation was performed without polyisocyanate, and a titration value $V_1$ mL was obtained. The NCO content of the polyisocyanate was calculated from the resulting titration value $V_2$ mL and the titration value $V_1$ mL based on the following expression:

NCO content=$(V_1-V_2) \times F \times 42/(W \times 1000) \times 100$ (Physical Property 2) Viscosity (mPa·s)

The viscosity of a polyisocyanate was measured at 25° C. using an E-type viscometer (manufactured by Tokimec Inc.). In this measurement, a standard rotor (1°34'×R24) was used. The rotational speed was as follows.

100 r.p.m. (when less than 128 mPa·s)
50 r.p.m. (when 128 mPa·s or more and less than 256 mPa·s)
20 r.p.m. (when 256 mPa·s or more and less than 640 mPa·s)
10 r.p.m. (when 640 mPa·s or more and less than 1280 mPa·s)
5 r.p.m. (when 1280 mPa·s or more and less than 2560 mPa·s)
2.5 r.p.m. (when 2560 mPa·s or more and less than 5120 mPa·s)
1.0 r.p.m. (when 5120 mPa·s or more and less than 10240 mPa·s)
0.5 r.p.m. (when 10240 mPa·s or more and less than 20480 mPa·s)

(Physical Property 3) Number Average Molecular Weight

The number average molecular weight of a polyisocyanate was determined as a number average molecular weight in terms of polystyrene by gel permeation chromatography (hereinafter abbreviated as "GPC") using the following apparatus.

Apparatus: "HLC-8120GPC" (trade name) manufactured by Tosoh Corporation
Columns: "TSKgel SuperH1000" (trade name)×1
"TSKgel SuperH2000" (trade name)×1
"TSKgel SuperH3000" (trade name)×1 manufactured by Tosoh Corporation
Carrier: Tetrahydrofuran
Detection method: Differential refractometry The number average molecular weight of a polyol was determined as a number average molecular weight in terms of polystyrene by the following GPC measurement.

Apparatus: "HLC-8120GPC" (trade name) manufactured by Tosoh Corporation
Column: "TSKgel SuperHM-H" (trade name)×2 manufactured by Tosoh Corporation
Carrier: N,N-Dimethylformamide
Detection method: Differential refractometry (Physical Property 4) Residual HDI Concentration (Mass %)

The residual HDI concentration of a polyisocyanate was determined as follows. Initially, a 20 mL sample bottle was placed on a digital scale, and about 1 g of a sample was precisely weighed. Next, 0.03 to 0.04 g of nitrobenzene (an internal standard solution) was added, and the weight was precisely measured. Finally, about 9 mL of ethyl acetate was added, and then the lid was tightly placed, followed by thorough mixing to prepare a sample. The prepared solution was analyzed and quantified by gas chromatography under the following conditions.

Apparatus: "GC-8A" manufactured by Shimadzu Corporation
Column: "Silicone OV-17" manufactured by Shinwa Chemical Industries Ltd.
Column oven temperature: 120° C.
Injection/detector temperature: 160° C.

(Physical Property 5) Average Number of Isocyanate Groups

The average number of isocyanate groups of a polyisocyanate was calculated from the number average molecular weight of (Physical Property 3) and the NCO content (the isocyanate concentration) of (Physical Property 1) based on the following expression:

$$\text{Average number of isocyanate groups} = \frac{(\text{Number average molecular weight}) \times (\text{Isocyanate group mass \%})}{\text{Formula weight of isocyanate (42)} \times 100}$$

(Physical Property 6) Effective NCO Content (Mass %)

The effective NCO content of a blocked polyisocyanate was determined as follows. Here, the effective NCO content (mass %) is for quantifying the amount of blocked isocyanate groups that are possibly involved in a crosslinking reaction and that are present in a blocked polyisocyanate composition after a blocking reaction, and is expressed as the mass % of isocyanate groups and calculated based on the following expression:

{(Solids content (mass %) of blocked polyisocyanate composition)×(Mass of polyisocyanate used in reaction×Polyisocyanate group content % of precursor polyisocyanate)}/(Resin mass of blocked polyisocyanate composition after blocking reaction)

When a sample was diluted with a solvent or the like, the value obtained in a diluted state was indicated.

(Physical Property 7) Solids Concentration (Mass %)

An aluminum plate having a bottom diameter of 38 mm was precisely weighed, then about 1 g of a blocked polyisocyanate composition of an Example or a Comparative Example was placed on the aluminum plate, and the weight was precisely measured (W1). The blocked polyisocyanate composition was adjusted to have a uniform thickness and retained in an oven at 105° C. for 1 hour. After the aluminum plate reached room temperature, the blocked polyisocyanate composition remaining on the aluminum plate was precisely weighed (W2).

Solids concentration=$W2/W1 \times 100$ (Physical Property 8) Molar Ratio of Keto Form to Enol Form The molar ratio of keto form/enol form was determined by 1H-NMR measurement using "Biospin Avance 600" (trade name) manufactured by Bruker Corporation. Specific measurement conditions were as follows.

Apparatus: "Biospin Avance 600" (trade name) manufactured by Bruker Corporation.
Solvent: Heavy chloroform
Number of scans: 256 times
Sample concentration: 5 mass %
Chemical shift reference: Tetramethylsilane being 0 ppm The integral values of the following signals were divided by the number of hydrogen atoms measured, and each molar ratio was calculated from the resulting values.

Keto form NH proton: (diethyl malonate represented by formula (VIII) below) in the vicinity of 7.3 ppm, (ethyl acetoacetate represented by formula (IX) below) in the vicinity of 7.2 ppm

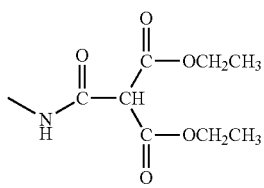

(VIII)

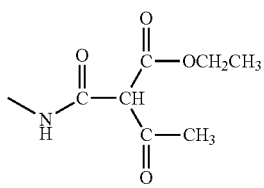

(IX)

Enol form NH proton: (diethyl malonate represented by formula (X) below) in the vicinity of 9.8 ppm, (ethyl acetoacetate represented by formula (XI) below) in the vicinity of 9.2 ppm

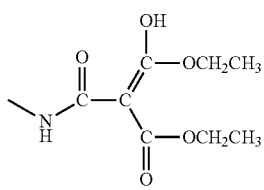

(X)

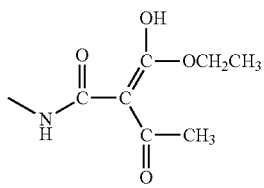

(XI)

(Physical Property 9) Methanetetracarbonyl Structure Proportion (Mol %)

The methanetetracarbonyl structure proportion of the blocked polyisocyanate composition was determined as follows. The molar proportion of methanetetracarbonyl structure/(methanetetracarbonyl structure+keto form of methanetricarbonyl structure+enol form of methanetricarbonyl structure) was determined by $^1$H-NMR measurement using "Avance 600" (trade name) manufactured by Bruker Biospin. Specific measurement conditions were as follows.

Apparatus: "Avance 600" (trade name) manufactured by Bruker Biospin
Solvent: Heavy chloroform
Number of scans: 256 times
Sample concentration: 5.0 mass %
Chemical shift reference: Tetramethylsilane being 0 ppm The integral values of the following signals were divided by the number of carbon atoms measured, and each molar ratio was calculated from the resulting values.

Keto form NH proton of methanetricarbonyl structure (the structure represented by formula (III) below): in the vicinity of 7.3 ppm: integral value÷1

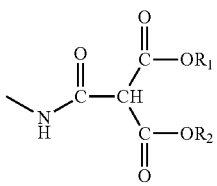

(III)

Enol form NH proton of methanetricarbonyl structure (the structure represented by formula (IV) below): in the vicinity of 9.8 ppm: integral value÷1

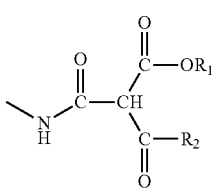

(IV)

NH proton of methanetetracarbonyl structure (the structure represented by formula (VII) below): in the vicinity of 8.0 ppm: integral value÷2

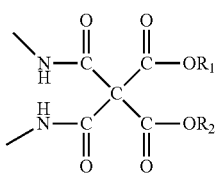

(VII)

(Physical Property 10) Molar Proportion of Urethane Bond Between Isocyanate Group and Monoalcohol Compound The $^1$H-NMR of the blocked polyisocyanate compositions obtained in Synthesis Examples 2 to 7 was measured, and the molar proportion of a urethane bond was determined from the peak areas resulting from an amino group resulting from a urethane bond obtained by the bonding of a monoalcohol compound and an isocyanate group (in the vicinity of 4.8 ppm), an amino group adjacent to an amide form formed by the bonding of an isocyanate group and diethyl malonate (in the vicinity of 7.3 ppm: keto form, in the vicinity of 8.0 ppm: diamide diester form, in the vicinity of 9.8 ppm: enol form), and an amino group adjacent to an amide form formed by the bonding of an isocyanate group and ethyl acetoacetate (in the vicinity of 7.2 ppm: keto form, in the vicinity of 9.2 ppm: enol form) based on the following expression:

Molar proportion of urethane bond=(a)/((a)+(b)+(c))

(b): The number (the number of moles) of bond structures of an isocyanate group and a malonic acid diester compound determined from the number of amino groups adjacent to an amide form formed by the bonding of an isocyanate group and diethyl malonate (=the peak area in the vicinity of 7.3 ppm+the peak area in the vicinity of 8.0 ppm/2+the peak area in the vicinity of 9.8 ppm: the peak in the vicinity of 8.0 ppm (a diamide diester form) has a structure having two amino groups per bond structure and, therefore, ½ of the peak area was regarded as the number of bond structures).

(c): The number (the number of moles) of bond structures of an isocyanate group and an acetoacetic acid ester compound determined from the number of amino groups adjacent to an amide form formed by the bonding of an isocyanate group and ethyl acetoacetate (=the peak area in the vicinity of 7.2 ppm+the peak area in the vicinity of 9.2 ppm).

(a): The number (the number of moles) of urethane bond structures of an isocyanate group and a monoalcohol compound determined from the number of amino groups resulting from a urethane bond obtained by the bonding of an isocyanate group with n-butanol, isobutanol or isopropanol (=the peak area in the vicinity of 4.8 ppm).

(Physical Property 11) Molar Ratio of Blocked Isocyanate Structure

The molar ratio of the blocked isocyanate structure in which either terminal alkyl group bonded to diethyl malonate was an alkyl group having 4 or more and 8 or fewer carbon atoms (hereinafter referred to as a "molar ratio M") was determined as follows using each blocked polyisocyanate composition obtained in the Examples and Comparative Examples as a sample. The molar ratio M was determined as described below by $^1$H-NMR measurement using "Avance 600" (trade name) manufactured by Bruker Biospin. Specific measurement conditions were as follows.

Apparatus: "Avance 600" (trade name) manufactured by Bruker Biospin

Solvent: Heavy chloroform

Number of scans: 256 times

Sample concentration: 5.0 mass %

Chemical shift reference: Tetramethylsilane being 0 ppm

The $^1$H-NMR of the blocked polyisocyanate composition was measured, and the molar fraction M was calculated from the peak area resulting from the proton (16.4 to 16.6 ppm) of the OH group of the enol form of the malonic acid diester based on the following expression:

Molar ratio $M=a/b$ a: Peak area of the above proton where at least one of the terminal alkyl groups is an alkyl group having 4 or more and 8 or fewer carbon atoms b: Total peak area of the above proton (Evaluation 1) Low-Temperature Curability "Setalux 1152" (acrylic polyol, a name of a commercial product manufactured by Allnex, a hydroxyl value of 138 mg KOH/g of resin, a solids concentration of 51 mass %) and a blocked polyisocyanate composition were blended so as to have NCO/OH=1.0, and adjusted to 20 seconds/23° C. with butyl acetate using a Ford cup No. 4, and thus an α coating material solution was obtained.

A PP plate was coated with the resulting α coating material solution with an air spray gun so as to have a dry film thickness of 40 μm, dried at a temperature of 23° C. for 30 minutes, and then baked at 90° C. for 20 minutes, and thus a cured coating film was obtained.

After being baked, the resulting cured coating film was left to stand at 20° C. for 1 hour, peeled from the PP plate, and immersed in acetone at 20° C. for 24 hours. The value (gel fraction) of the mass of the undissolved portion relative to the mass before immersion was calculated, and evaluations were made according to the following criteria.

⊚: Gel fraction of 90% or more

◯: Gel fraction of 80% or more and less than 90%

Δ: Gel fraction of 70% or more of less than 80%

X: Gel fraction of less than 70%

(Evaluation 2) Adhesion to Upper-Layer Coating Film

A mild steel plate was coated with the α coating material solution obtained in (Evaluation 1) with an air spray gun so as to have a dry film thickness of 40 μm, dried at a temperature of 23° C. for 30 minutes, and then baked at 90° C. for 20 minutes, and thus an α coating film layer 1 was obtained. The adhesion of the α coating film layer 1 to the mild steel plate was examined in accordance with JIS K5600-5-6. As a result, peeling, including partial bulging or the like, was not observed.

Then, 70 parts of "Setalux 1767" (acrylic polyol, a name of a commercial product manufactured by Allnex, a hydroxyl value of 150 mg KOH/g of resin, a solids content of 65 mass %), 30 parts by mass of hexamethoxymethylated melamine resin "Cymel® 300" manufactured by Nihon Cytec Industries Inc., and 1 part by mass of p-toluenesulfonic acid were mixed, and adjusted to 20 seconds/23° C. with butyl acetate using a Ford cup No. 4, and thus a β coating material solution was obtained.

Separately, a mild steel plate was coated with the α coating material solution obtained in (Evaluation 1) with an air spray gun so as to have a dry film thickness of 40 μm, dried at a temperature of 23° C. for 30 minutes, and then baked at 90° C. for 20 minutes, and thus an α coating film layer 2 was obtained. The α coating film layer 2 was coated with the β coating material solution so as to have a dry film thickness of 40 μm, dried at a temperature of 23° C. for 30 minutes, and then baked at 140° C. for 30 minutes, and thus a multilayer coating film having an α layer and a β layer was obtained. The adhesion of the resulting multilayer coating film was examined in accordance with JIS K5600-5-6. Evaluations were made according to the following criteria.

⊚: Coating film neither peeled nor bulged

◯: Cut part partially bulged

Δ: Less than half the coating film peeled

X: No less than half the coating film peeled (Evaluation 3) Compatibility

A glass plate was coated with the α coating material solution obtained in (Evaluation 1) with an air spray gun so as to have a dry film thickness of 80 μm, dried at a temperature of 23° C. for 30 minutes, baked at 90° C. for 20 minutes, and then cooled. The plate was visually examined, and evaluations were made according to the following criteria.

◯: Transparent

Δ: Slightly turbid

X: Highly turbid

[Production Example 1] Polyisocyanate P-1

A four-neck flask equipped with a stirrer, a thermometer, a reflux condenser tube, a nitrogen inlet tube, and a dropping funnel was nitrogen-purged and charged with 1100 parts by mass of HDI and 1.2 parts by mass of 1,3-butanediol, and the temperature inside the reactor was retained at 80° C. for 2 hours while stirring. Thereafter, the temperature inside the reactor was retained at 60° C., tetrabutylammonium acetate was added, and when the NCO content of the reaction solution reached 41.3 mass %, phosphoric acid was added to terminate the reaction. The reaction solution was filtered, then unreacted HDI was removed using a thin film evaporator, and thus polyisocyanate P-1 was obtained that had an NCO content of 21.0%, a viscosity at 25° C. of 3800 mPas, a residual HDI concentration of 0.2 mass %, and an average number of isocyanate groups of 3.6.

[Production Example 2] Polyisocyanate P-2

A four-neck flask equipped with a stirrer, a thermometer, a reflux condenser tube, and a nitrogen inlet tube was nitrogen-purged and charged with 100 parts by mass of HDI and 3.3 parts by mass of trimethylolpropane, and the temperature inside the reactor was retained at 80° C. for 2 hours while stirring. Thereafter, the temperature inside the reactor was retained at 60° C., tetrabutylammonium acetate was added, and when the NCO content of the reaction solution reached 36.3 mass %, phosphoric acid was added to terminate the reaction. The reaction solution was filtered, and then unreacted HDI was removed using a thin film evaporator. Thus, polyisocyanate P-2 was obtained that had an NCO content of 19.5%, a viscosity at 25° C. of 25000 mPas, a residual HDI concentration of 0.2 mass %, and an average number of isocyanate groups of 5.1.

[Production Example 3] Polyisocyanate P-3

A four-neck flask equipped with a stirrer, a thermometer, a reflux condenser tube, and a nitrogen inlet tube was nitrogen-purged and charged with 100 parts by mass of HDI, the temperature inside the reactor was retained at 60° C. while stirring, tetrabutylammonium acetate was added, and when the NCO content of the reaction solution reached 43.8 mass %, phosphoric acid was added to terminate the reaction. The reaction solution was filtered, then unreacted HDI was removed using a thin film evaporator, and thus isocyanurate-type polyisocyanate P-3 was obtained that had an NCO content of 19.5%, a viscosity at 25° C. of 1700 mPas, 23.0%, a residual HDI concentration of 0.2 mass %, and an average number of isocyanate groups of 3.2.

Example 1 Blocked Polyisocyanate Composition B-1

A four-neck flask equipped with a stirrer, a thermometer, a reflux condenser tube, and a nitrogen inlet tube was nitrogen-purged and charged with 100 parts by mass of polyisocyanate P-1, 67 parts by mass of diethyl malonate, 14 parts by mass of ethyl acetoacetate, and 39 parts by mass of n-butyl acetate. Then, 0.8 parts by mass of a 28% sodium methylate solution was added at a rate of 0.16 parts by mass/min at room temperature, and a reaction was carried out at 60° C. for 6 hours. Thereafter, 74 parts by mass of 1-butanol was added, and stirring was continued at that temperature for 2 hours. Then, 0.8 parts by mass of mono(2-ethylhexyl) phosphate was added thereto, and thus blocked polyisocyanate composition B-1 was obtained that had an effective NCO content of 7.1%, a solids concentration of 60 mass %, and a malonic acid diester adduct proportion of 80 mol %. A $^1$H-NMR measurement of the resulting blocked polyisocyanate composition B-1 was performed to quantify the molar ratio of the keto form to the enol form in the blocked polyisocyanate composition, the methanetetracarbonyl structure proportion in the isocyanate-malonic acid diester bond, the molar proportion of the urethane bond of the isocyanate group and the monoalcohol compound, and the molar ratio of the blocked isocyanate structure. Also, the above-described evaluations of (Evaluation 1) to (Evaluation 3) were performed. The obtained results are shown in Table 1.

Examples 2 to 6, Comparative Examples 1 to 2

Blocked polyisocyanate compositions B-2 to B-6 and B-8 to B-9 were obtained in the same manner as in Example 1 except that the formulations shown in Table 1 or 2 were used in Examples 2 to 6 and Comparative Examples 1 to 2. The physical property values and evaluation results of the resulting blocked polyisocyanate compositions are shown in Table 1 and Table 2.

Example 7

A four-neck flask equipped with a stirrer, a thermometer, a reflux condenser tube, and a nitrogen inlet tube was nitrogen-purged and charged with 100 parts by mass of polyisocyanate P-1, 67 parts by mass of diethyl malonate, 14 parts by mass of ethyl acetoacetate, and 39 parts by mass of n-butyl acetate. Then, 0.8 parts by mass of a 28% sodium methylate solution was added at a rate of 0.05 parts by mass/min at room temperature, and a reaction was carried out at 60° C. for 6 hours. Thereafter, 74 parts by mass of 1-butanol was added, and stirring was continued at that temperature for 2 hours while flowing nitrogen. Then, 0.8 parts by mass of mono(2-ethylhexyl) phosphate was added thereto, and thus blocked polyisocyanate composition B-7 was obtained that had an effective NCO content of 7.1%, a solids concentration of 60 mass %, and a malonic acid diester adduct proportion of 80 mol %. A $^1$H-NMR measurement of the resulting blocked polyisocyanate composition B-7 was performed to quantify the molar ratio of the keto form to the enol form in the blocked polyisocyanate composition, the methanetetracarbonyl structure proportion in the isocyanate-malonic acid diester bond, the molar proportion of the urethane bond of the isocyanate group and the monoalcohol compound, and the molar ratio of the blocked isocyanate structure. Also, the above-described evaluations of (Evaluation 1) to (Evaluation 3) were performed. The obtained results are shown in Table 1.

Comparative Example 3

Blocked polyisocyanate composition B-10 was obtained in the same manner as in Example 1 except that in the formulation shown in Table 2, a 28% sodium methylate solution was mixed in advance with blocking agent diethyl malonate and ethyl acetoacetate, and the mixture was gradually added at room temperature. The physical property values and evaluation results of the resulting blocked polyisocyanate composition are shown in Table 2.

TABLE 1

| Blocked polyisocyanate composition | | Example 1 | Example 2 | Example 3 | Example 4 | Example 5 | Example 6 | Example 7 |
|---|---|---|---|---|---|---|---|---|
| Polyisocyanate | Kind | P-1 | P-1 | P-1 | P-1 | P-2 | P-3 | P-1 |
| | [Parts by mass] | 100 | 100 | 100 | 100 | 100 | 100 | 100 |
| Solvent | n-Butyl acetate [Parts by mass] | 39 | 39 | 55 | 48 | 44 | — | 39 |
| | Xylene [Parts by mass] | — | — | 39 | — | — | 40 | — |
| Diethyl malonate | [Parts by mass] | 67 | 67 | 67 | 34 | 62 | 61 | 67 |
| Ethyl acetoacetate | [Parts by mass] | 14 | 14 | 14 | 28 | 13 | 25 | 14 |
| Further blocking agent | MEKO [Parts by mass] | — | — | — | 9 | — | — | — |

TABLE 1-continued

| Blocked polyisocyanate composition | | Example 1 | Example 2 | Example 3 | Example 4 | Example 5 | Example 6 | Example 7 |
|---|---|---|---|---|---|---|---|---|
| Diethyl malonate/ethyl acetoacetate | [Molar ratio] | 3.9 | 3.9 | 3.9 | 1.0 | 3.9 | 2.0 | 3.9 |
| 28% NaOMe methanol solution | [Parts by mass] | 0.8 | 0.8 | 0.8 | 0.8 | 0.8 | 0.8 | 0.8 |
| Addition rate of 28% NaOMe solution | [Parts by mass/min] | 0.16 | 0.05 | 0.02 | 0.8 | 0.05 | 0.04 | 0.05 |
| Monoalcohol | 1-Butanol [Parts by mass] | 74 | 74 | 19 | 59 | 66 | 76 | 74 |
| Monoalcohol/blocked isocyanate group | [Molar ratio] | 2.0 | 2.0 | 0.5 | 1.6 | 1.9 | 1.9 | 2.0 |
| Mono(2-ethylhexyl) phosphate | [Parts by mass] | 0.8 | 0.8 | 0.8 | 0.8 | 0.8 | 0.8 | 0.8 |
| (Physical Property 6) Effective NCO content | [Mass %] | 7.1 | 7.1 | 7.1 | 7.5 | 6.8 | 7.6 | 7.1 |
| (Physical Property 7) Solids concentration | [Mass %] | 60 | 60 | 60 | 60 | 60 | 60 | 60 |
| (Physical Property 8) Keto form/enol form | [Molar ratio] | 95/5 | 90/10 | 87/13 | 78/22 | 88/12 | 84/16 | 89/11 |
| (Physical Property 9) Methanetetracarbonyl structure proportion | [Mol %] | 0.6 | 2.5 | 6.5 | 0.1 | 2.5 | 2.8 | 2.2 |
| (Physical Property 10) Molar proportion of urethane bond between isocyanate group and monoalcohol compound | [Molar ratio] | — | 0.04 | — | — | 0.03 | — | 0.04 |
| (Physical Property 11) Molar ratio M | [Molar ratio] | — | — | — | — | — | — | 0.69 |
| (Evaluation 1) Low-temperature curability | | ◎ | ◎ | ○ | Δ | ◎ | Δ | ◎ |
| (Evaluation 2) Adhesion to upper-layer coating film | | Δ | ○ | ◎ | ◎ | ◎ | ◎ | ○ |
| (Evaluation 3) Compatibility with polyol | | ○ | ○ | ○ | Δ | ○ | ○ | ○ |

TABLE 2

| Blocked polyisocyanate composition | | Comparative Example 1 | Comparative Example 2 | Comparative Example 3 |
|---|---|---|---|---|
| Polyisocyanate | Kind | P-1 | P-1 | P-1 |
| | [Parts by mass] | 100 | 100 | 100 |
| Solvent | n-Butyl acetate [Parts by mass] | 48 | 39 | 39 |
| | Xylene [Parts by mass] | — | — | — |
| Diethyl malonate | [Parts by mass] | 34 | 67 | 67 |
| Ethyl acetoacetate | [Parts by mass] | 28 | 14 | 14 |
| Further blocking agent | MEKO [Parts by mass] | 9 | — | — |
| Diethyl malonate/ethyl acetoacetate | [Molar ratio] | 1.0 | 3.9 | 3.9 |
| 28% NaOMe methanol solution | [Parts by mass] | 0.8 | 0.8 | 0.8 |
| Addition rate of 28% NaOMe solution | [Parts by mass/min] | 0.08 | 0.8 | Mixed with blocking agent and gradually added |
| Monoalcohol | 1-Butanol [Parts by mass] | 59 | 74 | 74 |
| Monoalcohol/blocked isocyanate group | [Molar ratio] | 1.6 | 2.0 | 2.0 |
| Mono(2-ethylhexyl) phosphate | [Parts by mass] | 0.8 | 0.8 | 0.8 |
| (Physical Property 6) Effective NCO content | [Mass %] | 7.5 | 7.1 | 7.1 |
| (Physical Property 7) Solids concentration | [Mass %] | 60 | 60 | 60 |
| (Physical Property 8) Keto form/enol form | [Molar ratio] | 73/27 | 98/2 | 99/1 |
| (Physical Property 9) Methanetetracarbonyl structure proportion | [Mol %] | 1.3 | 0.3 | 0.2 |
| (Evaluation 1) Low-temperature curability | | Δ | ◎ | ◎ |
| (Evaluation 2) Adhesion to upper-layer coating film | | ◎ | X | X |
| (Evaluation 3) Compatibility with polyol | | X | ○ | ○ |

From the results of the Examples and Comparative Examples above, it was found that the blocked polyisocyanate composition of the present embodiment has excellent adhesion to an upper-layer coating film and excellent compatibility with polyol while maintaining a level of low-temperature curability that enables crosslinking at a baking temperature of 100° C. or lower.

Synthesis Method

Methods for synthesizing the blocked polyisocyanate compositions of Reference Examples and Comparative Reference Examples and the polyisocyanates used in the synthesis therefor are provided below.

Synthesis Example 1

(Synthesis of Polyisocyanate)

A four-neck flask equipped with a stirrer, a thermometer, a reflux condenser tube, a nitrogen inlet tube, and a dropping funnel was nitrogen-purged and charged with 1000 g of hexamethylene diisocyanate (HDI), and the temperature inside the reactor was retained at 60° C. while stirring. Thereafter, 2.1 g of tetramethylammonium acetate (2-butanol 5.0 mass % solution) as an isocyanuration reaction catalyst was added to perform a reaction. After 4 hours, the end point of the reaction was confirmed by measuring the refractive index of the reaction solution, and 0.2 g of phosphoric acid (85 mass % aqueous solution) was added to terminate the reaction.

The reaction solution was filtered, then unreacted HDI was removed using a thin film evaporator, and thus a polyisocyanate having an isocyanurate group was obtained. The resulting polyisocyanate had a viscosity at 25° C. of 2500 mPa·s and an NCO group content of 22.2 mass %.

Synthesis Example 2

(Production of Blocked Polyisocyanate Composition A)

A four-neck flask equipped with a stirrer, a thermometer, a reflux condenser tube, and a nitrogen inlet tube was nitrogen-purged and charged with 100 parts of the polyisocyanate obtained in Synthesis Example 1 and 42.3 parts of butyl acetate. A mixture of 71.1 parts of diethyl malonate, 14.5 parts of ethyl acetoacetate, and 0.8 parts of a 28% sodium methylate methanol solution was added at room temperature, and the reaction was continued at 80° C. for 1 hour. Thereafter, 76.0 parts of 1-butanol was added, and the mixture was stirred at 80° C. for 2 hours.

The effective NCO group content and the molar proportion of blocked polyisocyanate composition A containing 60 mass % of a blocked polyisocyanate are shown in Table 3.

Synthesis Example 3

(Production of Blocked Polyisocyanate Composition B)

The same apparatus as that for blocked polyisocyanate composition A was charged with 100 parts of polyisocyanate and 42.3 parts of butyl acetate. A mixture of 64.1 parts of diethyl malonate, 13.1 parts of ethyl acetoacetate, and 0.8 parts of a 28% sodium methylate methanol solution was added at room temperature, and the reaction was continued at 80° C. for 1 hour. Thereafter, 84.0 parts of 1-butanol was added, and the mixture was stirred at 80° C. for 2 hours while flowing nitrogen.

The effective NCO group content and the molar proportion of blocked polyisocyanate composition B containing 60 mass % of a blocked polyisocyanate are shown in Table 3.

Synthesis Example 4

(Production of Blocked Polyisocyanate Composition C)

The same apparatus as that for blocked polyisocyanate composition A was charged with 100 parts of polyisocyanate and 42.3 parts of butyl acetate. A mixture of 56.9 parts of diethyl malonate, 11.6 parts of ethyl acetoacetate, and 0.8 parts of a 28% sodium methylate methanol solution was added at room temperature, and the reaction was continued at 80° C. for 1 hour. Thereafter, 93.0 parts of 1-butanol was added, and the mixture was stirred at 80° C. for 2 hours.

The effective NCO group content and the molar proportion of blocked polyisocyanate composition C containing 60 mass % of a blocked polyisocyanate are shown in Table 3.

Synthesis Example 5

(Production of Blocked Polyisocyanate Composition D)

The same apparatus as that for blocked polyisocyanate composition A was charged with 100 parts of polyisocyanate and 42.3 parts of butyl acetate. A mixture of 56.9 parts of diethyl malonate, 11.6 parts of ethyl acetoacetate, and 0.4 parts of a 28% sodium methylate methanol solution was added at room temperature, and the reaction was continued at 80° C. for 0.5 hour. Thereafter, 93.0 parts of 1-butanol was added, and the mixture was stirred at 80° C. for 2 hours.

The effective NCO group content and the molar proportion of blocked polyisocyanate composition D containing 60 mass % of a blocked polyisocyanate are shown in Table 3.

Synthesis Example 6

(Production of Blocked Polyisocyanate Composition E)

The same apparatus as that for blocked polyisocyanate composition A was charged with 100 parts of polyisocyanate and 42.3 parts of butyl acetate. A mixture of 71.1 parts of diethyl malonate, 14.5 parts of ethyl acetoacetate, and 0.8 parts of a 28% sodium methylate methanol solution was added at room temperature, and the reaction was continued at 80° C. for 0.5 hour. Thereafter, 76.0 parts of 1-butanol was added, and the mixture was stirred at 80° C. for 2 hours while flowing nitrogen.

The effective NCO group content and the molar proportion of blocked polyisocyanate composition E containing 60 mass % of a blocked polyisocyanate are shown in Table 3.

Synthesis Example 7

(Production of Blocked Polyisocyanate Composition F)

Blocked polyisocyanate composition F was synthesized in the same manner as in Synthesis Example 2 except that 1.5 parts of a 28% sodium methylate methanol solution was used.

The effective NCO group content and the molar proportion of blocked polyisocyanate composition F containing 60 mass % of a blocked polyisocyanate are shown in Table 3.

Synthesis Example 8

(Production of Blocked Polyisocyanate Composition G)

Blocked polyisocyanate composition G was synthesized in the same manner as in Synthesis Example 2 except that the reaction temperature and the reaction time were 60° C. and 3 hours, respectively.

The effective NCO group content and the molar proportion of blocked polyisocyanate composition G containing 60 mass % of a blocked polyisocyanate are shown in Table 3.

Synthesis Example 9

(Production of Blocked Polyisocyanate Composition H)

Blocked polyisocyanate composition H was synthesized in the same manner as in Synthesis Example 2 except that isobutanol was used in place of 1-butanol.

The effective NCO group content and the molar proportion of blocked polyisocyanate composition H containing 60 mass % of a blocked polyisocyanate are shown in Table 3.

Synthesis Example 10

(Production of Blocked Polyisocyanate Composition I)

Blocked polyisocyanate composition I was synthesized in the same manner as in Synthesis Example 2 except that 61.0 parts of isopropanol was used in place of 76.0 parts of 1-butanol.

The effective NCO group content and the molar proportion of blocked polyisocyanate composition I containing 60 mass % of a blocked polyisocyanate are shown in Table 3.

Synthesis Example 11

(Production of Blocked Polyisocyanate Composition J)

Blocked polyisocyanate composition J was synthesized in the same manner as in Synthesis Example 2 except that 4.0 parts of a 28% sodium methylate methanol solution was added.

The effective NCO group content and the molar proportion of blocked polyisocyanate composition J containing 60 mass % of a blocked polyisocyanate are shown in Table 3.

Synthesis Example 12

(Production of Blocked Polyisocyanate Composition K)

The same apparatus as that for blocked polyisocyanate composition A was charged with 100 parts of polyisocyanate and 42.3 parts of butyl acetate. A mixture of 28.4 parts of diethyl malonate, 5.8 parts of ethyl acetoacetate, and 0.8 parts of a 28% sodium methylate methanol solution was added at room temperature, and the reaction was continued at 80° C. for 0.5 hour. Thereafter, 127.4 parts of 1-butanol was added, and the mixture was stirred at 80° C. for 2 hours.

The effective NCO group content and the molar proportion of blocked polyisocyanate composition K containing 60 mass % of a blocked polyisocyanate are shown in Table 3.

Synthesis Example 13

(Production of Blocked Polyisocyanate Composition L)

Blocked polyisocyanate composition L was synthesized in the same manner as in Synthesis Example 2 except that the reaction temperature and the reaction time were 80° C. and 0.2 hours, respectively.

The effective NCO group content and the molar proportion of blocked polyisocyanate composition L containing 60 mass % of a blocked polyisocyanate are shown in Table 3.

Synthesis Example 14

(Production of Blocked Polyisocyanate Composition M)

Blocked polyisocyanate composition M was synthesized in the same manner as in Synthesis Example 2 except that the reaction temperature and the reaction time were 80° C. and 6 hours, respectively.

The effective NCO group content and the molar proportion of blocked polyisocyanate composition M containing 60 mass % of a blocked polyisocyanate are shown in Table 3.

[Evaluation Method]

Methods for evaluating various physical properties of the blocked polyisocyanate compositions of the Reference Examples and Comparative Reference Examples are provided below.

(Evaluation 4) Curability

A polyisocyanate composition and acrylic polyol (Setalux 1152, manufactured by Allnex, a hydroxyl value of 70.4 mg KOH/g (as-is), a solids content of 61 mass %) were blended so as to have NCO/OH=1.0, the mixture was diluted with butyl acetate to a solids content of 50% to prepare a coating material composition.

A PP plate was applicator-coated with the resulting coating material composition such that the dried film thickness was 60 μm. The coating material composition was dried at a temperature of 23° C. for 30 minutes and baked at 100° C. for 30 minutes, and then the coating film was peeled from the plate. The residual film ratio (gel fraction) after immersion in acetone at 23° C. for 24 hours was measured.

<Evaluation Criteria>

○: Gel fraction of 90% or more

Δ: Gel fraction of 80% or more and less than 90%

X: Gel fraction of less than 80%

(Evaluation 5) Compatibility

A glass plate was applicator-coated with a coating material composition prepared by the same method as in the evaluation of curability (Evaluation 4) such that the film thickness was 80 μm, and then transparency was visually examined.

<Evaluation Criteria>

○: Not cloudy

X: Cloudy (Evaluation 6) Low-temperature storage stability

An appearance when a polyisocyanate composition was stored at −10° C. was examined.

<Evaluation Criteria>

○: Not cloudy after storage for 1 week

Δ: Not cloudy after storage for 3 days, and cloudy after storage for 1 week

X: Cloudy after storage for 3 days

Reference Examples 1-9, Comparative Reference Examples 1-4

Blocked polyisocyanate compositions A to M obtained in Synthesis Examples 2 to 14 were used to evaluate curability, compatibility, and low-temperature storage stability. The obtained results are shown in Table 3.

TABLE 3

| | | Reference Example 1 | Reference Example 2 | Reference Example 3 | Reference Example 4 | Reference Example 5 | Reference Example 6 | Reference Example 7 |
|---|---|---|---|---|---|---|---|---|
| | Blocked polyisocyanate composition | A | B | C | D | E | F | G |
| Starting materials | Polyisocyanate | 100 | 100 | 100 | 100 | 100 | 100 | 100 |
| | Diethyl malonate | 71.1 | 64.1 | 56.9 | 56.9 | 71.1 | 71.1 | 71.1 |
| | Ethyl acetoacetate | 14.5 | 13.1 | 11.6 | 11.6 | 14.5 | 14.5 | 14.5 |
| | Monoalcohol compound | 76 (1-Butanol) | 84 (1-Butanol) | 93 (1-Butanol) | 93 (1-Butanol) | 76 (1-Butanol) | 76 (1-Butanol) | 76 (1-Butanol) |
| | Butyl acetate | 42.3 | 42.3 | 42.3 | 42.3 | 42.3 | 42.3 | 42.3 |
| | (Physical Property 6) Effective NCO content [Mass %] | 7.2 | 7.2 | 7.5 | 8.0 | 7.2 | 7.2 | 7.2 |
| | (Physical Property 10) Molar proportion of urethane bond between isocyanate group and monoalcohol compound | 0.070 | 0.190 | 0.300 | 0.400 | 0.230 | 0.010 | 0.120 |
| | (Evaluation 4) Curability | ○ | ○ | ○ | Δ | ○ | ○ | ○ |
| | (Evaluation 5) Compatibility | ○ | ○ | ○ | ○ | ○ | ○ | ○ |
| | (Evaluation 6) Low-temperature storage stability | ○ | ○ | ○ | ○ | ○ | Δ | ○ |

TABLE 3-continued

|  |  | Reference Example 8 | Reference Example 9 | Comparative Reference Example 1 | Comparative Reference Example 2 | Comparative Reference Example 3 | Comparative Reference Example 4 |
|---|---|---|---|---|---|---|---|
|  | Blocked polyisocyanate composition | H | I | J | K | L | M |
| Starting materials | Polyisocyanate | 100 | 100 | 100 | 100 | 100 | 100 |
|  | Diethyl malonate | 71.1 | 71.1 | 71.1 | 28.4 | 71.1 | 71.1 |
|  | Ethyl acetoacetate | 14.5 | 14.5 | 14.5 | 5.8 | 14.5 | 14.5 |
|  | Monoalcohol compound | 76 (Isobutanol) | 61 (Isopropanol) | 76 (1-Butanol) | 127.4 (1-Butanol) | 76 (1-Butanol) | 76 (1-Butanol) |
|  | Butyl acetate | 42.3 | 42.3 | 42.3 | 42.3 | 42.3 | 42.3 |
| (Physical Property 6) Effective NCO content [Mass %] |  | 7.2 | 7.2 | 7.3 | 7.4 | 7.2 | 7.2 |
| (Physical Property 10) Molar proportion of urethane bond between isocyanate group and monoalcohol compound |  | 0.100 | 0.250 | 0.001 | 0.500 | 0.600 | 0.001 |
| (Evaluation 4) Curability |  | ○ | ○ | ○ | X | X | ○ |
| (Evaluation 5) Compatibility |  | ○ | ○ | X | ○ | ○ | X |
| (Evaluation 6) Low-temperature storage stability |  | ○ | ○ | X | ○ | ○ | X |

Synthesis Example 15 Polyisocyanate

A four-neck flask equipped with a stirrer, a thermometer, a reflux condenser tube, a nitrogen inlet tube, and a dropping funnel was nitrogen-purged and charged with 1000 g of HDI, and the temperature inside the reactor was retained at 60° C. while stirring. Thereafter, 2.1 g of tetramethylammonium acetate (2-butanol 5.0 mass % solution) as an isocyanuration reaction catalyst was added to perform a reaction. After 4 hours, the end point of the reaction was confirmed by measuring the refractive index of the reaction solution, and 0.2 g of phosphoric acid (85 mass % aqueous solution) was added to terminate the reaction. The reaction solution was filtered, then unreacted HDI was removed using a thin film evaporator, and thus polyisocyanate having an isocyanurate group was obtained. The resulting polyisocyanate had a viscosity at 25° C. of 2500 mPa·s and an NCO group content of 22.2 mass %.

Reference Example 10 Blocked Polyisocyanate Composition N

A four-neck flask equipped with a stirrer, a thermometer, and a nitrogen inlet tube was nitrogen-purged and charged with 100 parts of the polyisocyanate obtained in Synthesis Example 15 and 41.7 parts of butyl acetate. A mixture of 53.3 parts of diethyl malonate, 28.9 parts of ethyl acetoacetate, and 0.8 parts of a 28% sodium methylate solution was added at room temperature, and the reaction was continued at 80° C. for 2 hours. Thereafter, 74.6 parts of 1-butanol was added, the mixture was stirred at 80° C. for 3 hours while flowing nitrogen, and thus blocked polyisocyanate composition N having a resin content of 60% was obtained. The effective NCO group content and the molar ratio M of the resulting blocked polyisocyanate composition N are shown in Table 4.

Reference Example 11 Blocked Polyisocyanate Composition O

The same apparatus as in Reference Example 10 was charged with 100 parts of the polyisocyanate obtained in Synthesis Example 15 and 42.3 parts of butyl acetate. A mixture of 71.1 parts of diethyl malonate, 14.5 parts of ethyl acetoacetate, and 0.8 parts of a 28% sodium methylate solution was added at room temperature, and the reaction was continued at 80° C. for 2 hours. Thereafter, 76.0 parts of 1-butanol was added, and the mixture was stirred at 80° C. for 3 hours while flowing nitrogen. Thus, blocked polyisocyanate composition O having a resin content of 60% was obtained. The effective NCO group content and the molar ratio M of the resulting blocked polyisocyanate composition O are shown in Table 4.

Reference Example 12 Blocked Polyisocyanate Composition P

The same apparatus as in Reference Example 10 was charged with 100 parts of the polyisocyanate obtained in Synthesis Example 15 and 43.0 parts of butyl acetate. A mixture of 88.9 parts of diethyl malonate, and 0.8 parts of a 28% sodium methylate solution was added at room temperature, and the reaction was continued at 80° C. for 2 hours. Thereafter, 75.3 parts of 1-butanol was added, and the mixture was stirred at 80° C. for 3 hours while flowing nitrogen. Thus, blocked polyisocyanate composition P having a resin content of 60% was obtained. The effective NCO group content and the molar ratio M of the resulting blocked polyisocyanate composition P are shown in Table 4.

Reference Example 13 Blocked Polyisocyanate Composition Q

The same apparatus as in Reference Example 10 was charged with 100 parts of the polyisocyanate obtained in Synthesis Example 15 and 42.3 parts of butyl acetate. A mixture of 71.1 parts of diethyl malonate, 14.5 parts of ethyl acetoacetate, and 0.8 parts of a 28% sodium methylate solution was added at room temperature, and the reaction was continued at 80° C. for 2 hours. Thereafter, 76.0 parts of 1-butanol was added, and the mixture was stirred at 80° C. for 1 hours while flowing nitrogen. Thus, blocked polyisocyanate composition Q having a resin content of 60% was obtained. The effective NCO group content and the molar ratio M of the resulting blocked polyisocyanate composition Q are shown in Table 4.

Reference Example 14 Blocked Polyisocyanate Composition R

The same apparatus as in Reference Example 10 was charged with 100 parts of the polyisocyanate obtained in Synthesis Example 15 and 42.3 parts of butyl acetate. A mixture of 94.0 parts of diisopropyl malonate, 7.2 parts of ethyl acetoacetate, and 0.8 parts of a 28% sodium methylate solution was added at room temperature, and the reaction was continued at 50° C. for 2 hours. Thereafter, 82.2 parts of isobutanol was added, and the mixture was stirred at 80° C. for 3 hours while flowing nitrogen. Thus, blocked polyisocyanate composition R having a resin content of 60% was obtained. The effective NCO group content and the molar ratio M of the resulting blocked polyisocyanate composition R are shown in Table 4.

Comparative Reference Example 5 Blocked Polyisocyanate Composition S

The same apparatus as in Reference Example 10 was charged with 100 parts of the polyisocyanate obtained in Synthesis Example 15 and 42.3 parts of butyl acetate. A mixture of 94.0 parts of diisopropyl malonate, 7.2 parts of ethyl acetoacetate, and 0.8 parts of a 28% sodium methylate solution was added at room temperature, and the reaction was continued at 50° C. for 2 hours. Thereafter, 82.2 parts of isobutanol was added, and the mixture was stirred at 50° C. for 2 hours in a nitrogen atmosphere (without flowing). Thus, blocked polyisocyanate composition S having a resin content of 60% was obtained. The effective NCO group content and the molar ratio M of the resulting blocked polyisocyanate composition S are shown in Table 4.

Comparative Reference Example 6 Blocked Polyisocyanate Composition T

A four-neck flask equipped with a stirrer, a thermometer, a reflux condenser, and a dropping funnel was nitrogen-purged and charged with 100 parts of the polyisocyanate obtained in Synthesis Example 15 and 42.3 parts of butyl acetate. A mixture of 71.1 parts of diethyl malonate, 14.5 parts of ethyl acetoacetate, and 0.8 parts of a 28% sodium methylate solution was added at room temperature, and the reaction was continued at 80° C. for 2 hours. Thereafter, 76.0 parts of 1-butanol was added, and the mixture was stirred at 80° C. for 1 hour in a nitrogen atmosphere (without flowing). Thus, blocked polyisocyanate composition T having a resin content of 60% was obtained. The effective NCO group content and the molar ratio M of the resulting blocked polyisocyanate composition T are shown in Table 4.

Comparative Reference Example 7 Blocked Polyisocyanate Composition U

The same apparatus as in Reference Example 10 was charged with 100 parts of the polyisocyanate obtained in Synthesis Example 15 and 49.1 parts of butyl acetate. A mixture of 120.0 parts of dibutyl malonate and 0.8 parts of a 28% sodium methylate solution was added at room temperature, and the reaction was continued at 80° C. for 2 hours. Thereafter, 89.7 parts of 1-butanol was added. Thus, blocked polyisocyanate composition U having a resin content of 60% was obtained. The effective NCO group content and the molar ratio M of the resulting blocked polyisocyanate U are shown in Table 4.

(Evaluation 7) Curability

Blocked polyisocyanate compositions N to U obtained in Reference Example 10 to 14 and Comparative Reference Example 5 to 7 and Setalux 1152 (acrylic polyol, manufactured by Allnex, a hydroxyl value of 70.4 mg KOH/g (as-is), a solids content of 51 mass %) were blended so as to have NCO/OH=1.0, and the mixture was diluted with butyl acetate to a solids content of 50%. A PP plate was applicator-coated with the resulting coating material composition such that the resin film thickness was 80 μm. The coating material composition was dried at a temperature of 23° C. for 30 minutes and baked at 100° C. for 30 minutes, and then the coating film was peeled from the plate. The residual film ratio (gel fraction) after immersion in acetone at 23° C. for 24 hours was measured, and curability was evaluated according to the following evaluation criteria.

(Evaluation Criteria)

◯: Gel fraction of 90 mass % or more

X: Gel fraction of less than 90%

(Evaluation 8) Compatibility

A glass plate was applicator-coated with a coating material composition prepared by the same method as in (Evaluation 7) curability such that the resin film thickness was 80 μm, then transparency was visually examined, and compatibility was evaluated according to the following evaluation criteria.

(Evaluation Criteria)

◯: Not cloudy

X: Cloudy (Evaluation 9) Storage Stability

The viscosity of a coating material composition prepared by the same method as in (Evaluation 7) curability was measured by the same method as in (Physical Property 2) before and after storage at 50° C. for 1 week, and storage stability was evaluated according to the following evaluation criteria.

(Evaluation Criteria)

◯: Less than 10 times the initial level

Δ: 10 times or more and less than 30 times the initial level

X: 30 times or more than the initial level

The results of evaluating the (Evaluation 7) curability, (Evaluation 8) compatibility, and (Evaluation 9) storage stability of blocked polyisocyanate compositions N to U obtained in Reference Examples 10 to 14 and Comparative Reference Examples 5 to 7 are shown in Table 4.

TABLE 4

|  | Reference Example 10 | Reference Example 11 | Reference Example 12 | Reference Example 13 | Reference Example 14 | Comparative Reference Example 5 | Comparative Reference Example 6 | Comparative Reference Example 7 |
|---|---|---|---|---|---|---|---|---|
| Blocked polyisocyanate composition | N | O | P | Q | R | S | T | U |
| (Physical Property 6) Effective NCO content (mass %) | 7.2 | 7.2 | 7.1 | 7.2 | 6.7 | 6.7 | 7.3 | 6.1 |
| (Physical Property 11) Molar ratio M | 0.86 | 0.84 | 0.90 | 0.60 | 0.82 | 0.35 | 0.40 | 1.0 |
| (Evaluation 4) Curability | ◯ | ◯ | ◯ | ◯ | ◯ | ◯ | ◯ | X |
| (Evaluation 5) Compatibility | ◯ | ◯ | ◯ | ◯ | ◯ | X | X | ◯ |
| (Evaluation 6) Storage stability | ◯ | ◯ | ◯ | Δ | ◯ | X | X | ◯ |

The present application is based on a Japanese patent application (Japanese Patent Application No. 2015-180016) filed with the Japanese Patent Office on Sep. 1, 2015, a Japanese patent application (Japanese Patent Application No. 2015-180021) filed with the Japanese Patent Office on Sep. 11, 2015, a Japanese patent application (Japanese Patent Application No. 2015-207937) filed with the Japanese Patent Office on Oct. 22, 2015, and a Japanese patent application (Japanese Patent Application No. 2015-225990) filed with the Japanese Patent Office on Nov. 18, 2015, the contents of which are incorporated herein by reference.

INDUSTRIAL APPLICABILITY

The blocked polyisocyanate composition according to the present invention can be suitably used as a one-component coating composition having excellent low-temperature curability, adhesion to an upper layer, and compatibility with polyols.

Since a specific linking group in a blocking agent is contained in a specific proportion, the blocked polyisocyanate composition according to the present invention has excellent low-temperature curability, compatibility, and low-temperature storage stability. Accordingly, the blocked polyisocyanate composition provides excellent performance as a coating material, an adhesive, a pressure sensitive adhesive, an ink, a sealant, a casting agent, an encapsulating agent, a surface modifier, a coating agent, and the like. Also, since a specific terminal alkyl group generated with a blocking agent is contained in a specific proportion, the blocked polyisocyanate composition has excellent low-temperature curability, storage stability, and compatibility. Accordingly, the blocked polyisocyanate composition provides excellent performance as a coating material, an adhesive, a pressure sensitive adhesive, an ink, a sealant, a casting agent, an encapsulating agent, a surface modifier, a coating agent, and the like.

The invention claimed is:

1. A blocked polyisocyanate composition comprising
a blocked polyisocyanate obtained from a blocking agent and
a polyisocyanate derived from at least one diisocyanate selected from the group consisting of an aliphatic diisocyanate and an alicyclic diisocyanate, wherein
the blocking agent comprises at least one selected from the group consisting of a malonic acid diester compound represented by formula (I) below and a β-ketoester compound represented by formula (II) below,
wherein a molar ratio of a total of a keto form structure represented by formula (III) below and a keto form structure represented by formula (IV) below to a total of an enol form structure represented by formula (V) below and an enol form structure represented by formula (VI) below is 75/25 or more and 97/3 or less:

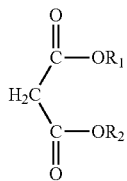

(I)

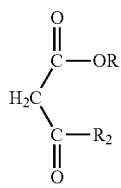

(II)

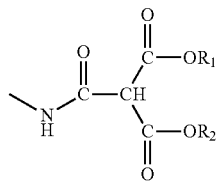

(III)

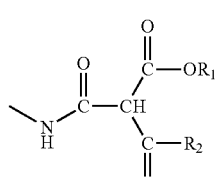

(IV)

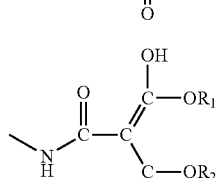

(V)

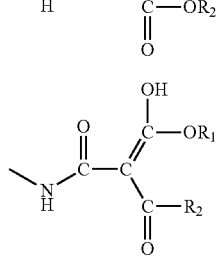

(VI)

wherein $R_1$ and $R_2$ each independently represent an alkyl group having 1 to 8 carbon atoms, a cycloalkyl group, a phenyl group, or a benzyl group; and a plurality of $R_1$ or $R_2$ are independent from each other.

2. The blocked polyisocyanate composition according to claim 1, wherein the molar ratio of the total of the keto form structures to the total of the enol form structures is 75/25 or more and 96/4 or less.

3. The blocked polyisocyanate composition according to claim 1, wherein
the blocking agent comprises the malonic acid diester compound, and
a proportion of a methanetetracarbonyl structure represented by formula (VII) below to a total amount of an isocyanate-malonic acid diester bonded structure is 0.5 mol % or more and 10 mol % or less:

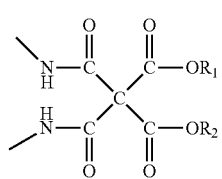

(VII)

wherein $R_1$ and $R_2$ each independently represent an alkyl group having 1 to 8 carbon atoms, a cycloalkyl group, a phenyl group, or a benzyl group.

4. The blocked polyisocyanate composition according to claim 1, further comprising a monoalcohol compound, wherein when numbers of moles of following 3 bonds contained in the blocked polyisocyanate are referred to as (a) to (c), respectively, (a)/((a)+(b)+(c))=0.0020 or more and less than 0.50:

(a) a urethane bond between an isocyanate group and the monoalcohol compound (b) a bond between the isocyanate group and the malonic acid diester compound (c) a bond between the isocyanate group and the β-ketoester compound.

5. The blocked polyisocyanate composition according to claim 1, further comprising a monoalcohol compound, wherein the blocked polyisocyanate composition comprises at least a blocked isocyanate structure in which an isocyanate group is blocked with enol form of the malonic acid diester compound and which is represented by formula (V), and in the blocked polyisocyanate composition, a molar ratio of the blocked isocyanate structure in which at least one of $R_1$ and $R_2$ in formula (V) represents an alkyl group having 4 or more and 8 or fewer carbon atoms to a total amount of the blocked isocyanate structure is 0.50 or more and less than 0.95.

6. The blocked polyisocyanate composition according to claim 1, wherein the blocking agent comprises the malonic acid diester compound and the β-ketoester compound.

7. The blocked polyisocyanate composition according to claim 6, wherein a molar ratio of the malonic acid diester compound to the β-ketoester compound exceeds 1.0.

8. The blocked polyisocyanate composition according to claim 1, wherein the malonic acid diester compound is diethyl malonate, and the β-keto ester compound is ethyl acetoacetate.

9. A one-component coating composition comprising the blocked polyisocyanate composition according to claim 1 and a polyol.

10. A coating film formed of the one-component coating composition according to claim 9.

11. A coated article coated with the one-component coating composition according to claim 9.

12. The blocked polyisocyanate composition according to claim 2, wherein the blocking agent comprises the malonic acid diester compound and the β-ketoester compound.

13. The blocked polyisocyanate composition according to claim 12, wherein a molar ratio of the malonic acid diester compound to the β-ketoester compound exceeds 1.0.

* * * * *